US007171486B2

(12) United States Patent
Narad et al.

(10) Patent No.: US 7,171,486 B2
(45) Date of Patent: Jan. 30, 2007

(54) REASSEMBLY OF A TRANSMISSION CONTROL PROTOCOL (TCP) DATA STREAM FROM PAYLOADS OF TCP SEGMENTS OF A BIDIRECTIONAL TCP CONNECTION

(75) Inventors: Charles E. Narad, Santa Clara, CA (US); Kevin Fall, Berkley, CA (US); Neil MacAvoy, Redwood City, CA (US); Pradip Shankar, Fremont, CA (US); Leonard M. Rand, San Francisco, CA (US); Jerry J. Hall, Santa Clara, CA (US)

(73) Assignee: Intel Corpoartion, Santa Clara, CA (US)

( * ) Notice: Subject to any disclaimer, the term of this patent is extended or adjusted under 35 U.S.C. 154(b) by 0 days.

(21) Appl. No.: 10/748,997

(22) Filed: Dec. 29, 2003

(65) Prior Publication Data

US 2004/0143655 A1  Jul. 22, 2004

Related U.S. Application Data

(63) Continuation of application No. 10/059,770, filed on Jan. 28, 2002, now Pat. No. 6,701,338, which is a continuation of application No. 09/283,662, filed on Apr. 1, 1999, now Pat. No. 6,421,730, which is a continuation of application No. 09/097,858, filed on Jun. 15, 1998, now Pat. No. 6,157,955.

(51) Int. Cl.
*G06F 13/00* (2006.01)

(52) U.S. Cl. .................................................... 709/232
(58) Field of Classification Search .............. 370/464, 370/465, 469, 474, 395.5, 395.52; 709/223
See application file for complete search history.

(56) References Cited

U.S. PATENT DOCUMENTS

| 5,485,455 | A | | 1/1996 | Dobbins et al. |
| 5,537,552 | A | | 7/1996 | Ogasawara et al. |
| 5,764,645 | A | | 6/1998 | Bernet et al. |
| 6,078,953 | A | | 6/2000 | Vaid et al. |
| 6,115,393 | A | * | 9/2000 | Engel et al. ............ 370/469 |

FOREIGN PATENT DOCUMENTS

EP  0 632 625 A1  6/1993

OTHER PUBLICATIONS

R. Braden "Requirements for Internet Hosts—Communicatioin Layers" Request for Comments 1122 (RFC1122), Internet Engineering Task Force, Oct. 1989: pp. 1-115.*

(Continued)

*Primary Examiner*—Robert B. Harrell
(74) *Attorney, Agent, or Firm*—Robert A. Greenberg

(57) ABSTRACT

Described herein are techniques to perform reassembly of a Transmission Control Protocol (TCP) data stream from payloads of TCP segments of a bidirectional TCP connection between a first TCP end-point operating at a first network device and a second TCP end-point operating at a second network device.

17 Claims, 9 Drawing Sheets

OTHER PUBLICATIONS

R. Braden, et al., "Integrated Services in the Internet Architecture: an Overview", Network Working Group, rfc1663, 25 Pgs.

Birman et al: Design and Implementation of a QoX Capable Switch-Router; IBM Research Report RC 20848 (Jan. 31, 1997) Computer Science; pp. 1-24 (25 pages).

CISCO: Interface Queue Management; XP-002210177; Aug. 1, 2002; 12 pages.

Kumar et al: Beyond Best Effort: Router Architectures for the differentiated Services of Tomorrow's Internet; IEEE Communications Magazine, May 1998; XP-000752860; pp. 152-164.

P/1325.EP/MWM Supplementary Search Report dated Feb. 7, 2003.

Application No. 99 928 599.2—1249; EP Office Action dated Jan. 23, 2006.

\* cited by examiner

REASSEMBLY OF A TRANSMISSION CONTROL PROTOCOL (TCP) DATA STREAM FROM PAYLOADS OF TCP SEGMENTS OF A BIDIRECTIONAL TCP CONNECTION

RELATED APPLICATIONS

The subject patent application is a continuation of, and claims priority to, U.S. patent application Ser. No. 10/059,770, entitled "Cumulative Status of Arithmetic Operations", filed Jan. 28, 2002, now U.S. Pat. No. 6,701,338; which is, in turn, a continuation of, and claims priority to, U.S. patent application Ser. No. 09/283,662, entitled "Programmable System for Processing a Partitioned Network Infrastructure", filed Apr. 1, 1999, now U.S. Pat. No. 6,421,730; which is, in turn, a continuation of, and claims priority to, U.S. patent application Ser. No. 09/097,858, entitled "Packet Processing System including a Policy Engine having a Classification Unit" filed Jun. 15, 1998, now U.S. Pat. No. 6,157,955.

The subject patent application is related to U.S. patent application Ser. No. 10/100,746, entitled "Multiple Consumer—Multiple Producer Rings", filed Mar. 18, 2002, now U.S. Pat. No. 6,625,689; and U.S. patent application Ser. No. 10/084,815, entitled "Programmable System for Processing a Partitioned Network Infrastructure" filed Feb. 27, 2002, now U.S. Pat. No. 6,859,841. The patent application is also related to U.S. patent application Ser. No. 09/282,790, entitled "Platform Permitting Execution of Multiple Network Infrastructure Applications", filed Mar. 31, 1999, and issued as U.S. Pat. No. 6,401,117. The subject patent application is also related to a patent application, filed on the same day as the present application, naming the same inventor, entitled "Language for Handling Network Packets", U.S. patent application Ser. No. 10/748,311.

FIELD OF THE INVENTION

The present invention relates to computer networks and, more particularly, to reassembly of a Transmission Control Protocol (TCP) data stream from payloads of TCP segments of a bidirectional TCP connection.

BACKGROUND OF THE INVENTION

Computer networks have become a key part of the corporate infrastructure. Organizations have become increasingly dependent on intranets and the Internet and are demanding much greater levels of performance from their network infrastructure. The network infrastructure is being viewed: (1) as a competitive advantage; (2) as mission critical; (3) as a cost center. The infrastructure itself is transitioning from 10 Mb/s (megabits per second) capability to 100 Mb/s capability. Soon, infrastructure capable of 1 Gb/s (gigabits per second) will start appearing on server connections, trunks and backbones. As more and more computing equipment gets deployed, the number of nodes within an organization has also grown. There has been a doubling of users, and a ten-fold increase in the amount of traffic every year.

Network infrastructure applications monitor, manage and manipulate network traffic in the fabric of computer networks. The high demand for network bandwidth and connectivity has led to tremendous complexity and performance requirements for this class of application. Traditional methods of dealing with these problems are no longer adequate.

Several sophisticated software applications that provide solutions to the problems encountered by the network manager have emerged. The main areas for such applications are Security, Quality of Service (QoS)/Class of Service (CoS) and Network Management. Examples are: Firewalls; Intrusion Detection; Encryption; Virtual Private Networks (VPN); enabling services for ISPs (load balancing and such); Accounting; Web billing; Bandwidth Optimization; Service Level Management; Commerce; Application Level Management; Active Network Management There are three conventional ways in which these applications are deployed:
(1) On general purpose computers.
(2) Using single function boxes.
(3) On switches and routers.

It is instructive to examine the issues related to each of these deployment techniques.

1. General Purpose Computers

General Purpose computers, such as PCs running NT/Windows or workstations running Solaris/HP-UX, etc. are a common method for deploying network infrastructure applications. The typical configuration consists of two or more network interfaces each providing a connection to a network segment. The application runs on the main processor (Pentium/SPARC etc.) and communicates with the Network Interface Controller (NIC) card either through (typically) the socket interface or (in some cases) a specialized driver "shim" in the operating system (OS). The "shim" approach allows access to "raw" packets, which is necessary for many of the packet oriented applications. Applications that are end-point oriented, such as proxies can interface to the top of the IP (Internet Protocol) or other protocol stack.

The advantages of running the application on a general purpose computer include: a full development environment; all the OS services (IPC, file system, memory management, threads, I/O etc); low cost due to ubiquity of the platform; stability of the APIs; and assurance that performance will increase with each new generation of the general purpose computer technology.

There are, however, many disadvantages of running the application on a general purpose computer. First, the I/O subsystem on a general purpose computer is optimized to provide a standard connection to a variety of peripherals at reasonable cost and, hence, reasonable performance. 32 b/33 MHz PCI ("Peripheral Connection Interface", the dominant I/O connection on common general purpose platforms today) has an effective bandwidth in the 50–75 MB/s range. While this is adequate for a few interfaces to high performance networks, it does not scale. Also, there is significant latency involved in accesses to the card. Therefore, any kind of non-pipelined activity results in a significant performance impact.

Another disadvantage is that general purpose computers do not typically have good interrupt response time and context switch characteristics (as opposed to real-time operating systems used in many embedded applications). While this is not a problem for most computing environments, it is far from ideal for a network infrastructure application. Network infrastructure applications have to deal with network traffic operating at increasingly higher speeds and less time between packets. Small interrupt response times and small context switch times are very necessary.

Another disadvantage is that general purpose platforms do not have any specialized hardware that assist with network infrastructure applications. With rare exception, none of the instruction sets for general purpose computers are optimized for network infrastructure applications.

Another disadvantage is that, on a general purpose computer, typical network applications are built on top of the TCP/IP stack. This severely limits the packet processing capability of the application.

Another disadvantage is that packets need to be pulled into the processor cache for processing. Cache fills and write backs become a severe bottleneck for high bandwidth networks.

Finally, general purpose platforms use general purpose operating systems (OS's). These operating systems are generally not known for having quick reboots on power-cycle or other wiring-closet appliance oriented characteristics important for network infrastructure applications.

2. Fixed-Function Appliances

There are a couple of different ways to build single function appliances. The first way is to take a single board computer, add in a couple of NIC cards, and run an executive program on the main processor. This approach avoids some of the problems that a general purpose OS brings, but the performance is still limited to that of the base platform architecture (as described above).

A way to enhance the performance is to build special purpose hardware that performs functions required by the specific application very well. Therefore, from a performance standpoint, this can be a very good approach.

There are, however, a couple of key issues with special function appliances. For example, they are not expandable by their very nature. If the network manager needs a new application, he/she will need to procure a new appliance. Contrast this with loading a new application on a desktop PC. In the case of a PC, a new appliance is not needed with every new application.

Finally, if the solution is not completely custom, it is unlikely that the solution is scalable. Using a PC or other single board computer as the packet processor for each location at which that application is installed is not cost-effective.

3. Switches and Routers

Another approach is to deploy a scaled down version of an application on switches and routers which comprise the fabric of the network. The advantages of this approach are that: (1) no additional equipment is required for the deployment of the application; and (2) all of the segments in a network are visible at the switches.

There are a number of problems with this approach.

One disadvantage is that the processing power available at a switch or router is limited. Typically, this processing power is dedicated to the primary business of the switch/router—switching or routing. When significant applications have to be run on these switches or routers, their performance drops.

Another disadvantage is that not all nodes in a network need to be managed in the same way. Putting significant processing power on all the ports of a switch or router is not cost-effective.

Another disadvantage is that, even if processing power became so cheap as to be deployed freely at every port of a switch or router, a switch or router is optimized to move frames/packets from port to port. It is not optimized to process packets, for applications.

Another disadvantage is that a typical switch or router does not provide the facilities that are necessary for the creation and deployment of sophisticated network infrastructure applications. The services required can be quite extensive and porting an application to run on a switch or router can be very difficult.

Finally, replacing existing network switching equipment with new versions that support new applications can be difficult. It is much more effective to "add applications" to the network where needed.

What is needed is an optimized platform for the deployment of sophisticated software applications in a network environment.

SUMMARY

Described herein are techniques to perform reassembly of a Transmission Control Protocol (TCP) data stream from payloads of TCP segments of a bidirectional TCP connection between a first TCP end-point operating at a first network device and a second TCP end-point operating at a second network device.

DETAILED DESCRIPTION OF PREFERRED EMBODIMENTS

This section describes the programming model and set of abstractions employed when creating an application for a platform such as the sample NetBoost platform illustrated in FIGS. 1–4. An application on the NetBoost platform is to be considered a service, provided within the network, that may require direct knowledge or manipulation of network packets or frames. The programming model provides for direct access to low-level frame data, plus a set of library functions capable of reassembling low-level frame data into higher-layer messages or packets. In addition, the library contains functions capable of performing protocol operations on network or transport-layer messages.

An application developed for the NetBoost platform receives link-layer frames from an attached network interface, matches the frames against some set of selection criteria, and determines their disposition. Frame processing takes place as a sequence of serialized processing steps. Each step includes a classification and action phase. During the classification phase, frame data is compared against application-specified matching criteria called rules. When a rule's matching criteria evaluates true, its action portion specifies the disposition of the frame. Execution of the action portion constitutes the action Phase. Only the actions of rules with true matching criteria are executed.

Implementing an application for the NetBoost platform involves partitioning the application into two modules. Modules are a grouping of application code destined to execute in a particular portion of the NetBoost platform. There are two modules required: the application processor (AP) module, and the policy engine (PE) module. Application code in the AP module runs on the host processor, and is most appropriate for processing not requiring wire-speed access to network frames. Application code for the PE module comprises the set of classification rules written in the NetBoost Classification Language (NCL), and an accompanying set of compiled actions (C or C++ functions/objects). PE actions are able to manipulate network frames with minimal overhead, and are thus the appropriate mechanism for implementing fast and simple manipulation of frame data. The execution environment for PE action code is more restricted than that of AP code (no virtual memory or threads), but includes a library providing efficient implementation for common frame manipulation tasks. A message passing facility allows for communication between PE action code and the AP module.

1. Application Structure

Figure 5:
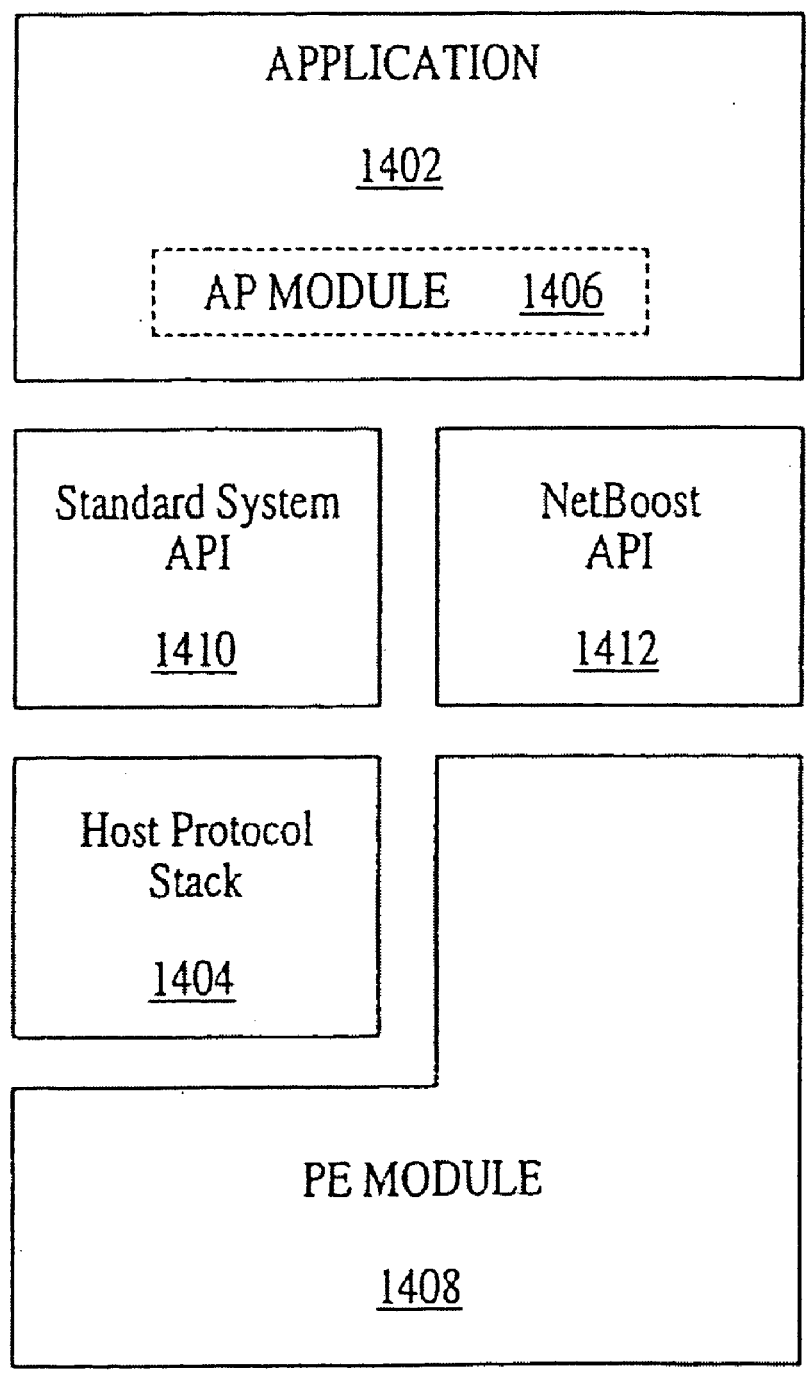
FIG. 5 is an application structure diagram related to the present invention.

FIG. 5 illustrates the NetBoost application structure.

Applications 1402 written for the NetBoost platform must be partitioned into the following modules and sub-modules, as illustrated in FIG. 5.

AP Module (-application processor (host) module) 1406
PE Module (-policy engine module) 1408
  Classification rules—specified in NCL
  Action implementation—object code provided by app developer The AP module 1406 executes in the programming environment of a standard operating system and has access to all PEs 1408 available on the system, plus the conventional APIs implemented in the host operating system. Thus, the AP module 1406 has the capability of performing both frame-level processing (in conjunction with the PE), or traditional network processing using a standard API.

The PE 1408 module is subdivided into a set of classification rules and actions. Classification rules are specified in the NetBoost Classification Language (NCL) and are compiled on-the-fly by a fast incremental compiler provided by NetBoost. Actions are implemented as relocatable object code provided by the application developer. A dynamic linker/loader included with the NetBoost platform is capable of linking and loading the classification rules with the action implementations and loading these either into the host (software implementation) or hardware PE (hardware implementation) for execution.

The specific division of functionality between AP and PE modules 1406 and 1408 in an application is left entirely up to the application designer. Preferably, the AP module 1406 should be used to implement initialization and control, user interaction, exception handling, and infrequent processing of frames requiring special attention. The PE module 1408 preferably should implement simple processing on frames (possibly including the reconstruction of higher-layer messages) requiring extremely fast execution. PE action code runs in a run-to-completion real-time environment without memory protection, similar to an interrupt handler in most conventional operating systems. Thus, functions requiring lengthy processing times should be avoided, or executed in the AP module 1406. In addition, other functions may be loaded into the PE to support actions, asynchronous execution, timing, or other processing (such as upcalls/downcalls, below). All code loaded into the PE has access to the PE runtime environment, provided by the ASL.

The upcall/downcall facility provides for communication between PE actions and AP functions. An application may use upcalls/downcalls for sharing information or signaling between the two modules. The programmer may use the facility to pass memory blocks, frame contents, or other messages constructed by applications in a manner similar to asynchronous remote procedure calls.

2. Basic Building Blocks

This section describes the C++ classes needed to develop an application for the NetBoost platform. Two fundamental classes are used to abstract the classification and handling of network frames:

ACE, representing classification and action steps
Target, representing possible frame destinations 2.1 ACEs The ACE class (short for Action-Classification-Engine) abstracts a set of frame classification criteria and associated actions, upcall/downcall entrypoints, and targets. They are simplex: frame processing is uni-directional. An application may make use of cascaded ACEs to achieve serialization of frame processing. ACEs are local to an application.

ACEs provide an abstraction of the execution of classification rules, plus a container for holding the rules and actions. ACEs are instantiated on particular hardware resources either by direct control of the application or by the plumber application.

Figure 6:
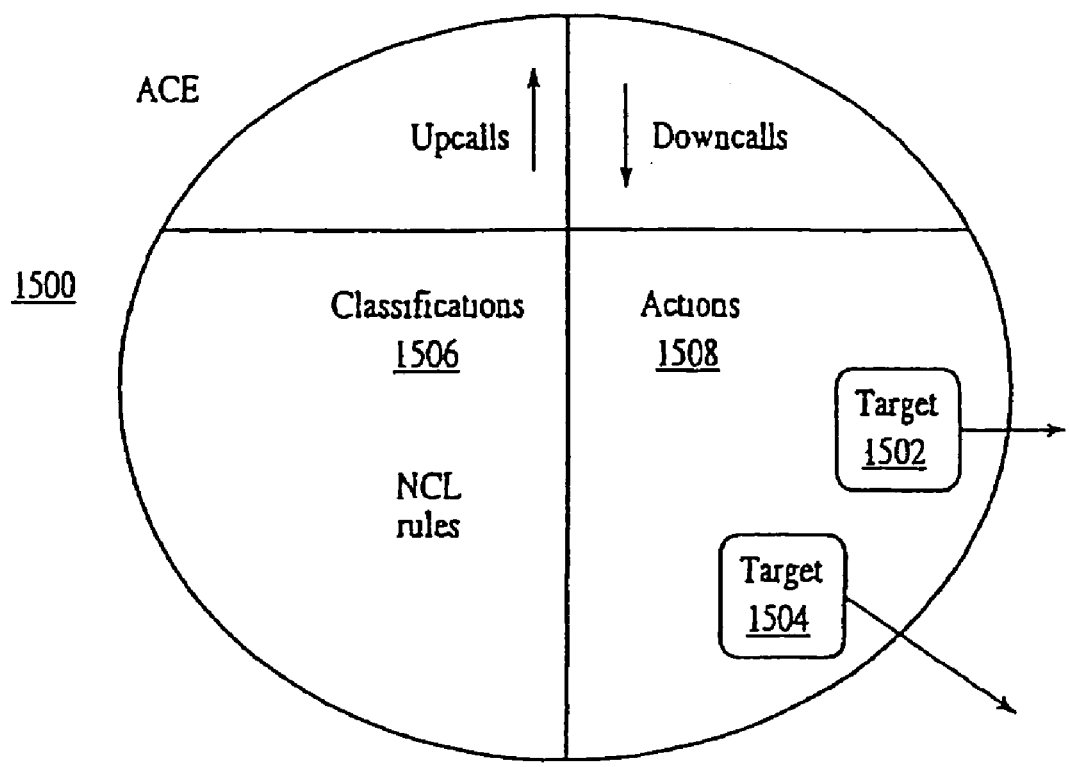
FIG. 6 is a diagram showing an Action Classification Engine (ACE) related to the present invention.

An ACE 1500 is illustrated in FIG. 6:

The ACE is the abstraction of frame classification rules 1506 and associated actions 1508, destinations for processed frames, and downcall/upcall entrypoints. An application may employ several ACEs, which are executed in a serial fashion, possibly on different hardware processors.

FIG. 6 illustrates an ACE with two targets 1502 and 1504. The targets represent possible destinations for frames and are described in the following section.

Frames arrive at an ACE from either a network interface or from an ACE. The ACE classifies the frame according its rules. A rule is a combination of a predicate and action. A rule is said to be "true" or to "evaluate true" or to be a "matching rule" if its predicate portion evaluates true in the Boolean sense for the current frame being processed. The action portion of each matching rule indicates what processing should take place.

The application programmer specifies rule predicates within an ACE using Boolean operators, packet header fields, constants, set membership queries, and other operations defined in the NetBoost Classification Language (NCL), a declarative language described below. A set of rules (an NCL program) may be loaded or unloaded from an ACE dynamically under application control. In certain embodiments, the application developer implements actions in a conventional high level language. Special external declaration statements in NCL indicate the names of actions supplied by the application developer to be called as the action portion for matching rules.

Actions are function entry-points implemented according to the calling conventions of the C programming language (static member functions in C++ classes are also supported). The execution environment for actions includes a C and C++ runtime environment with restricted standard libraries appropriate to the PE execution environment. In addition to the C environment, the ASL library provides added functionality for developing network applications. The ASL provides support for handling many TCP/IP functions such as IP fragmentation and re-assembly, Network Address Translation (NAT), and TCP connection monitoring (including stream reconstruction). The ASL also provides support for encryption and basic system services (e.g. timers, memory management).

During classification, rules are evaluated first-to-last. When a matching rule is encountered, its action executes and returns a value indicating whether it disposed of the frame. Disposing of a frame corresponds to taking the final desired action on the frame for a single classification step (e.g. dropping it, queueing it, or delivering it to a target). If an action executes but does not dispose of the current frame, it returns a code indicating the frame should undergo further rule evaluations in the current classification step. If any action disposes of the frame, the classification phase terminates. If all rules are evaluated without a disposing action, the frame is delivered to the default target of the ACE.

2.2 Targets

Targets specify possible destinations for frames (an ACE or network interface). A target is said to be bound to either an ACE or network interface (in the outgoing direction), otherwise it is unbound. Frames delivered to unbound targets are dropped. Target bindings are manipulated by a plumbing application in accordance with the present invention.

Figure 7:
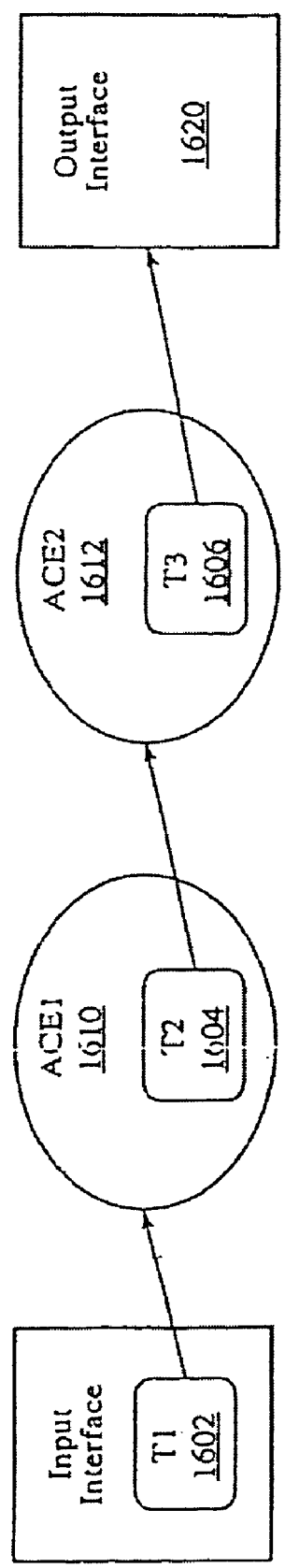
FIG. 7 shows a cascade of ACEs related to the present invention.

FIG. 7 shows a cascade of ACEs. ACEs use targets as frame destinations. Targets 1 and 2 (illustrated at 1602 and 1604) are bound to ACEs 1 and 2 (illustrated at 1610 and 1612), respectively. Target 3 (at 1606) is bound to a network interface (1620) in the outgoing direction. Processing occurs serially from left to right. Ovals indicate ACEs, hexagons indicate network interfaces. Outgoing arcs indicate bound targets. An ACE with multiple outgoing arcs indicates an ACE that performs a demultiplexing function: the set of outgoing arcs represent the set off all frame destinations in the ACE, across all actions. In this example, each ACE has a single destination (the default target). When several hardware resources are available for executing ACEs (e.g. in the case of the NetBoost hardware platform), ACEs may execute more efficiently (using pipelining). Note, however, that when one ACE has finished processing a frame, it is given to another ACE that may execute on the same hardware resource.

3. Complex Configurations

As described above, a single application may employ more than one ACE. Generally, processing bidirectional network data will require a minimum of two ACEs. Four ACEs may be a common configuration for a system providing two network interfaces and an application wishing to install ACEs at the input and output for each interface (e.g. in the NetBoost hardware environment with one PE).

Figure 8:
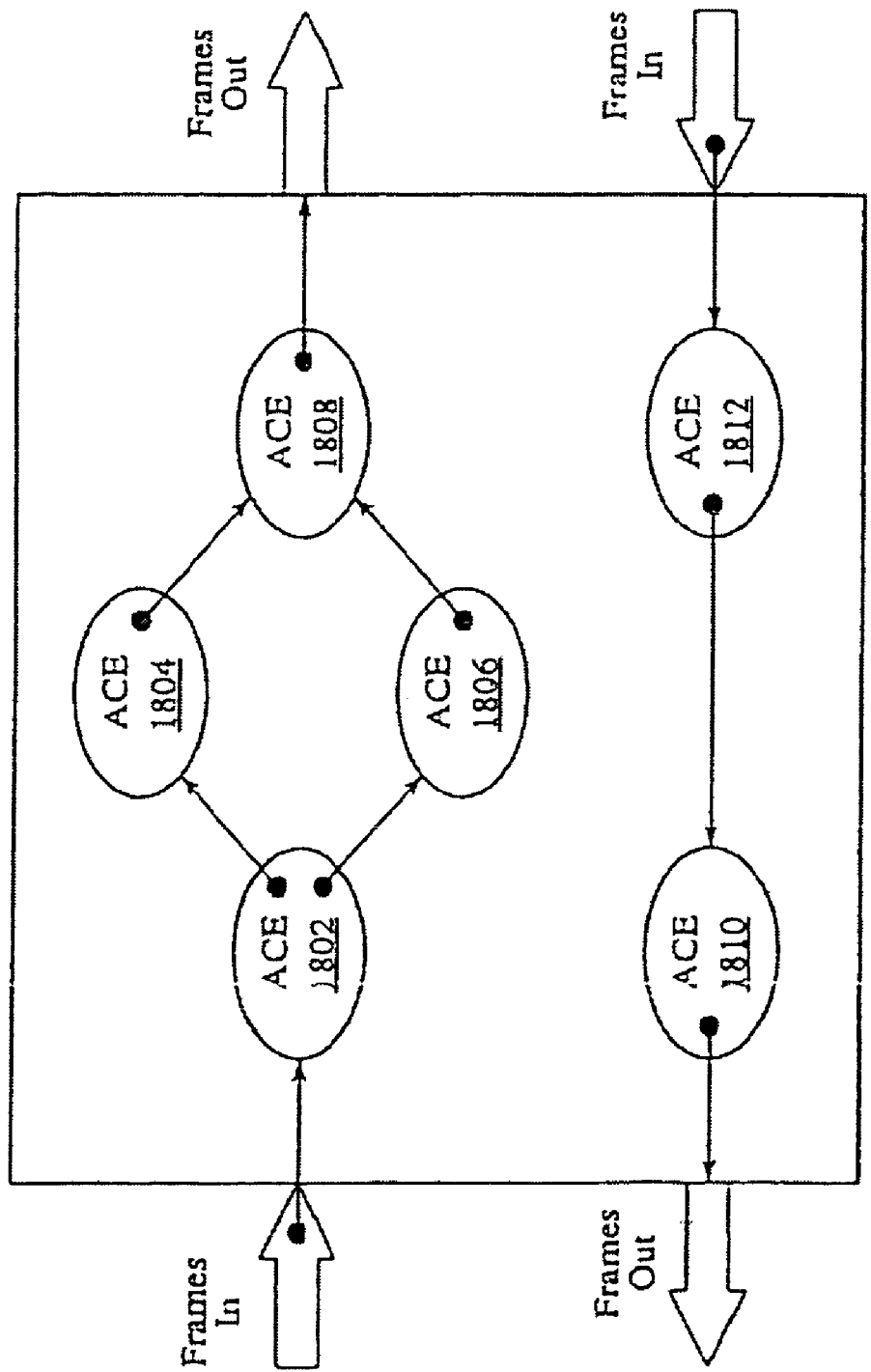
FIG. 8 shows a system architecture related to the present invention.

FIG. 8 illustrates an application employing six ACEs 1802, 1804, 1806, 1808, 1810 and 1812. Shaded circles represent targets. Two directions of processing are depicted, as well as an ACE with more than one output arc and an ACE with more than one input arc. The arcs represent possible destinations for frames.

An ACE depicted with more than one outgoing arc may represent the processing of a single frame, or in certain circumstances, the replication (copying) of a frame to be sent to more than one downstream ACE simultaneously. Frame replication is used in implementing broadcast and multicast forwarding (e.g. in layer 2 bridging and IP multicast forwarding). The interconnection of targets to downstream objects is typically performed by the plumber application described in the next section.

4. Software Architecture

Figure 9:
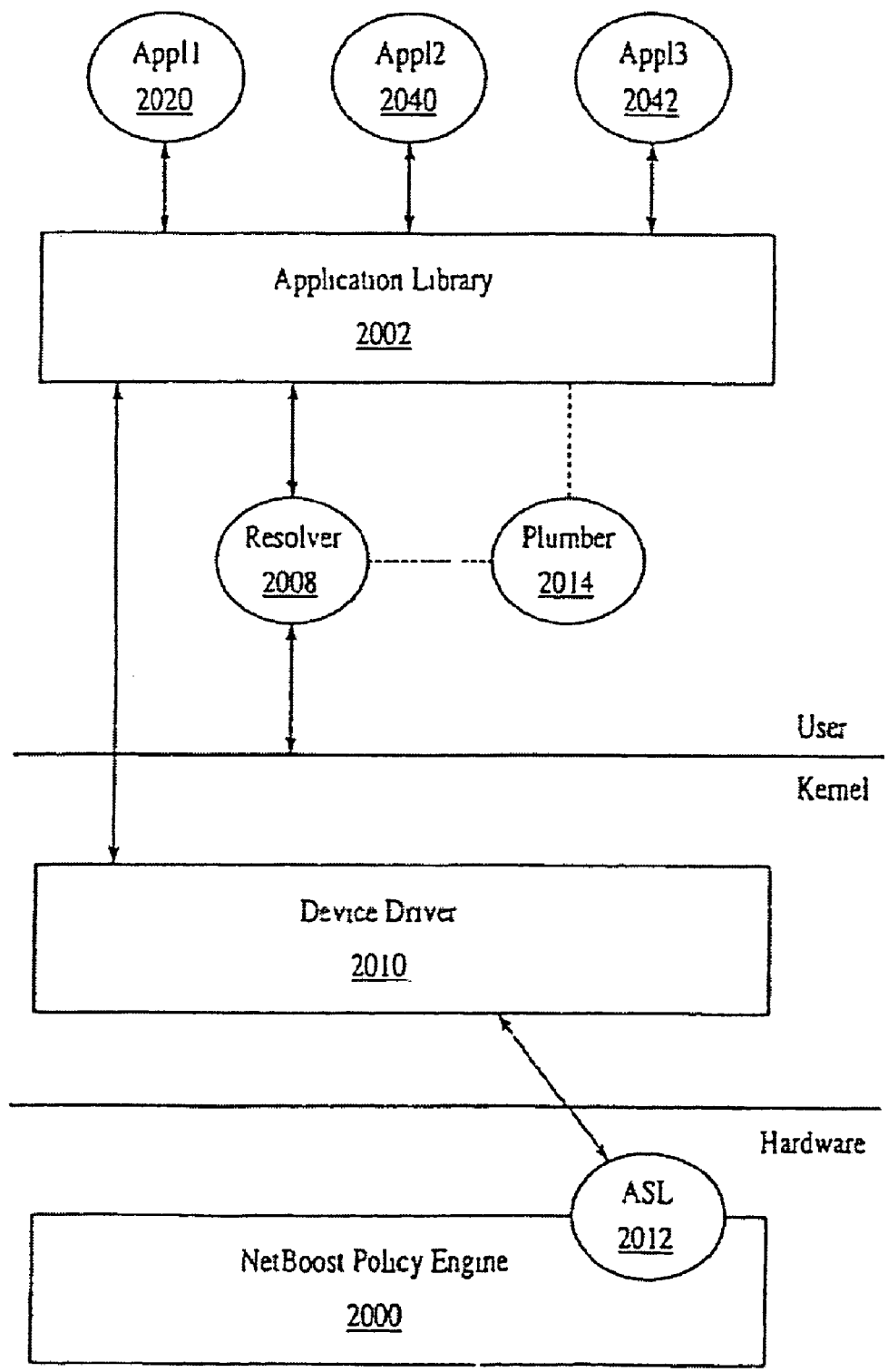
FIG. 9 shows an application deploying six ACEs related to the present invention.

This section describes the major components comprising the NetBoost software implementation. The software architecture provides for the execution of several applications performing frame-layer processing of network data, and includes user-level, kernel-level, and embedded processor-level components (for the hardware platform). The software architecture is illustrated FIG. 9.

The layers of software comprising the overall architecture are described bottom-up. The first layer is the NetBoost Policy Engine 2000 (PE). Each host system may be equipped with one or more PEs. In systems equipped with NetBoost hardware PEs, each PE will be equipped with several frame classifiers and a processor responsible for executing action code. For systems lacking the hardware PE, all PE functionality is implemented in software. The PE includes a set of C++ library functions comprising the Action Services Library (ASL) which may be used by action code in ACE rules to perform messaging, timer-driven event dispatch, network packet reassembly or other processing.

The PE interacts with the host system via a device driver 2010 and ASL 2012 supplied by NetBoost. The device driver is responsible for supporting maintenance operations to NetBoost PE cards. In addition, this driver is responsible for making the network interfaces supplied on NetBoost PE cards available to the host system as standard network interfaces. Also, specialized kernel code is inserted into the host's protocol stack to intercept frames prior to receipt by the host protocol stack (incoming) or transmission by conventional network interface cards (outgoing).

The Resolver 2008 is a user-level process started at boot time responsible for managing the status of all applications using the NetBoost facilities. In addition, it includes the NCL compiler and PE linker/loader. The process responds to requests from applications to set up ACEs, bind targets, and perform other maintenance operations on the NetBoost hardware or software-emulated PE.

The Application Library 2002 (having application 1, 2 & 3 shown at 2020, 2040, 2042) is a set of C++ classes providing the API to the NetBoost system. It allows for the creation and configuration of ACEs, binding of targets, passing of messages to/from the PE, and the maintenance of the name-to-object bindings for objects which exist in both the AP and PE modules.

The plumber 2014 is a management application used to set up or modify the bindings of every ACE in the system (across all applications). It provides a network administrator the ability to specify the serial order of frame processing by binding ACE targets to subsequent ACEs. The plumber is built using a client/server architecture, allowing for both local and remote access to specify configuration control. All remote access is authenticated and encrypted.

Classification Language

The NetBoost Classification Language (NCL) is a declarative high level language for defining packet filters. The language has six primary constructs: protocol definitions, predicates, sets, set searches, rules and external actions. Protocol definitions are organized in an object-oriented fashion and describe the position of protocol header fields in packets. Predicates are Boolean functions on protocol header fields and other predicates. Rules consist of a predicate/action pair having a predicate portion and an action portion where an action is invoked if its corresponding predicate is true. Actions refer to procedure entrypoints implemented external to the language.

Individual packets are classified according to the predicate portions of the NCL rules. More than one rule may be true for any single packet classification. The action portion of rules with true predicates are invoked in the order the rules have been specified. Any of these actions invoked may indicate that no further actions are to be invoked. NCL provides a number of operators to access packet fields and execute comparisons of those fields. In addition, it provides a set abstraction, which can be used to determine containment relationships between packets and groups of defined objects (e.g. determining if a particular packet belongs to some TCP/IP flow or set of flows), providing the ability to keep persistent state in the classification process between packets.

Standard arithmetic, logical and bit-wise operators are supported and follow their equivalents in the C programming language. These operators provide operations on the fields of the protocols headers and result in scalar or Boolean values. An include directive allows for splitting NCL programs into several files.

1. Names and Data Types

The following definitions in NCL constants have names: protocols, predicates, fields, sets, searches on sets, and rules (defined later subsequent sections). A name is formed using any combination of alphanumeric characters and underscores except the first character must be an alphabetic character. Names are case sensitive. For example, set_tcp_udp IsIP isIPv6 set_udp_ports

The above examples are all legal names. The following examples are all illegal names:

6_byte_ip set_tcp+udp ip_src&dst

The first is illegal because it starts with a numeric character; the other two are illegal because they contain operators.

Protocol fields (see Section 6) are declared in byte-oriented units, and used in constructing protocols definitions. All values are big-endian. Fields specify the location and size of portions of a packet header. All offsets are relative to a particular protocol. In this way it is possible to specify a particular header field without knowing the absolute offset of the any particular protocol header. Mask and shift operations support the accessing of non-byte-sized header fields. For example, dst { ip[16:4] } ver { (ip[0:1] & 0xf0) >> 4 }

In the first line, the 4-byte field dst is specified as being at byte offset 16 from the beginning of the IP protocol header. In the second example, the field ver is a half-byte sized field at the beginning of the IP header.

2. Operators

Arithmetic, logical and bit-wise binary operators are supported. Table 23 lists the arithmetic operators and grouping operator supported:

TABLE 23

Arithmetic operators

| Operator | Description |
|---|---|
| ( ) | Grouping operator |
| + | Addition |
| − | Subtraction |
| << | Logical left shift |
| >> | Logical right shift |

The arithmetic operators result in scalar quantities, which are typically used for comparison. These operators may be used in field and predicate definitions. The shift operations do not support arithmetic shifts. The shift amount is a compile time constant. Multiplication, division and modulo operators are not supported. The addition and subtraction operations are not supported for fields greater than 4 bytes.

Logical operators are supported that result in Boolean values. Table 24 provides the logical operators that are supported by the language.

TABLE 24

Logical operators

| Operator | Description |
|---|---|
| && | Logical AND |
| \|\| | Logical OR |
| ! | Not |
| > | Greater Than |
| >= | Greater Than or Equal To |
| < | Less Than |
| <= | Less Than or Equal To |
| == | Equal To |
| != | Not Equal |

Bit-wise operators are provided for masking and setting of bits. The operators supported are as follows:

TABLE 25

Bit-wise operators

| Operators | Description |
|---|---|
| & | Bit-wise AND |
| \| | Bit-wise OR |
| ^ | Bit-wise Exclusive OR |
| ~ | Bit-wise One's Compliment |

The precedence and the associativity of all the operators listed above are shown in Table 26. The precedence is listed in decreasing order.

TABLE 26

Operator precedence

| Precedence | Operators | Associativity |
|---|---|---|
| High | ( ) [] | Left to right |
| . | !~ | Right to left |
| . | +− | Left to right |
| . | << >> | Left to right |
| . | <<= >>= | Left to right |
| . | ==!= | Left to right |
| . | & | Left to right |
| . | ^ | Left to right |

TABLE 26-continued

| Operator precedence | | |
| --- | --- | --- |
| Precedence | Operators | Associativity |
| . | \| | Left to right |
| . | && | Left to right |
| Low | \|\| | Left to right |

3. Field Formats

The language supports several standard formats, and also domain specific formats, for constants, including the dotted-quad form for IP version 4 addresses and colon-separated hexadecimal for Ethernet and IP version 6 addresses, in addition to conventional decimal and hexadecimal constants. Standard hexadecimal constants are defined as they are in the C language, with a leading 0x prefix.

For data smaller than 4 bytes in length, unsigned extension to 4 bytes is performed automatically. A few examples are as shown below:

TABLE 27

| Constant formats | |
| --- | --- |
| 0x11223344 | Hexadecimal form |
| 101.230.135.45 | Dot separated IP address form |
| ff:12:34:56:78:9a | Colon separated MAC address form |

4. Comments

C and C++ style comments are supported. One syntax supports multiple lines, the other supports comments terminating with a newline. The syntax for the first form follows the C language comment syntax using/* and */to demark the start and end of a comment, respectively. The syntax for the second form follows the C++ comment syntax, using/to indicate the start of the comment. Such comments end at the end of the line. Nesting of comments is not allowed in the case of the first form. In the second case, everything is discarded to the end of the line, so nesting of the second form is allowed. Comments can occur anywhere in the program. A few examples of comments are shown below, Diagram 1: Legal comments

```
/* Comment in a single line */
    // Second form of the comment: compiler ignores to end-of-line
/* Comments across multiple line
    second line
third line */
    // Legal comment // still ignored to end-of-line
/*     First form   // Second form, but OK
*/
```

The examples above are all legal. The examples shown in Diagram 11 (below) are illegal.

Diagram 2: Illegal comments

```
/*    space */
/    new line
*  Testing */
/*    Nesting /* Second level */
*/
```

Diagram 2: Illegal comments

```
/ /   space
/     new-line
/
//    /* Nesting
*/
```

The first comment is illegal because of the space between / and *, and the second one because of the new-line. The third is illegal because of nesting. The fourth is illegal because of the space between the '/' chars and the next one because of the new-line. The last one is illegal because the /* is ignored, causing the */ to be in error of nesting of the first form of the comment in the second form.

5. Constant Definitions and Include Directives

The language provides user-definable symbolic constants. The syntax for the definition is the keyword #define, then the name followed by the constant. No spaces are allowed between # and define. The constant can be in any of the forms described in the next subsection of this patent application. The definition can start at the beginning of a line or any other location on a line as long as the preceding characters are either spaces or tabs. For example, Diagram 3: Sample of constant definition usage

| #define | TELNET_PORT_NUM | 23 // Port number for telnet |
| --- | --- | --- |
| #define | IP_ADDR | 10.4.7.18 |
| #define | MAC_ADDR | cd.ee.f0.34.74.93 |

The language provides the ability to include files within the compilation unit so that pre-existing code can be reused. The keyword #include is used, followed by the filename enclosed in double quotes. The # must start on a new-line, but may have spaces immediately preceding the keyword. No space are allowed between # and the include. The filename is any legal filename supported by the host. For example, Diagram 4: Sample include directives

| #include | "myproto.def" | // Could be protocol definitions |
| --- | --- | --- |
| #include | "stdrules.rul" | // Some standard rules |
| #include | "newproto.def" | /* New protocol definitions */ |

6. Protocol Definitions

NCL provides a convenient method for describing the relationship between multiple protocols and the header fields they contain. A protocol defines fields within a protocol header, intrinsics (built-in functions helpful in processing headers and fields), predicates (Boolean functions on fields and other predicates), and the demultiplexing method to high-layer protocols. The keyword protocol identifies a protocol definition and its name. The name may later be referenced as a Boolean value which evaluates true if the protocol is activated (see 6.2). The declarations for fields, intrinsics and demultiplexing are contained in a protocol definition as illustrated below.

6.1 Fields

Fields within the protocol are declared by specifying a field name followed by the offset and field length in bytes. Offsets are always defined relative to a protocol. The base offset is specified by the protocol name, followed by colon separated offset and size enclosed in square brackets. This syntax is as shown below:

field_name { protocol_name[offset:size] }

Fields may be defined using a combination of byte ranges within the protocol header and shift/mask or grouping operations. The field definitions act as access methods to the areas within in the protocol header or payload. For example, fields within a protocol named MyProto might be specified as follows:

| | |
|---|---|
| dest_addr | {MyProto[6-4]} |
| bit_flags | {(MyProto[10-2] & 0x0ff0) >> 8 } |

In the first example, field dest_addr is declared as a field at offset 6 bytes from the start of the protocol MyProto and 4 bytes in size. In the second example, the field bit_flags is a bit field because it crosses a byte boundary, two bytes are used in conjunction with a mask and right shift operation to get the field value.

6.2 Intrinsics

Intrinsics are functions listed in a protocol statement, but implemented internally. Compiler-provided intrinsics are declared in the protocol definition (for consistency) using the keyword intrinsic followed by the intrinsic name. Intrinsics provide convenient or highly optimized functions that are not easily expressed using the standard language constructs. One such intrinsic is the IP checksum. Intrinsics may be declared within the scope of a protocol definition or outside, as in the following examples:

Diagram 5: Sample intrinsic declarations

```
protocol foo {
    ...field defs...
    intrinsic chksumvalid {i}
}
intrinsic now
```

The first example indicates chksumvalid intrinsic is associated with the protocol foo. Thus, the expression foo.chksumvalid could be used in the creation of predicates or expressions defined later. The second example indicates a global intrinsic called now that may be used anywhere within the program. Intrinsics can return Boolean and scalar values.

In a protocol definition, predicates are used to define frequently used Boolean results from the fields within the protocol being defined. They are identified by the keyword predicate. Predicates are described in section 7.

6.3 Demux

The keyword demux in each protocol statement indicates how demultiplexing should be performed to higher-layer protocols. In effect, it indicates which subsequent protocol is "activated", as a function of fields and predicates defined within the current set of activated protocols.

Evaluation of the Boolean expressions within a protocol demux statement determines which protocol is activated next. Within a demux statement, the first expression which evaluates to true indicates that the associated protocol is to be activated at a specified offset relative to the first byte of the present protocol. The starting offset of the protocol to be activated is specified using the keyword at. A default protocol may be specified using the keyword default. The first case of the demux to evaluate true indicates which protocol is activated next. All others are ignored. The syntax for the demux is as follows:

Diagram 6: Demux syntax sample

```
demux {
    boolean exp { protocol_name at offset }
    default { protocol_name at offset }
}
```

Diagram 7 shows an example of the demux declaration.

Diagram 7: Sample protocol demux

```
demux {
    (length == 10)           { proto_a at offset_a }
    (flags && predicate x)   { proto_b at offset_b }
    default                  { proto_default at offset_default }
}
```

In the above example, protocol proto_a is "activated" at offset offset_a if the expression length equals ten. Protocol proto_b is activated at offset offset_b if flags is true, predicate_x is true and length is not equal to 10. predicate_x is a pre-defined Boolean expression. The default protocol is proto_default, which is defined here so that packets not matching the predefined criteria can be processed. The fields and predicates in a protocol are accessed by specifying the protocol and the field or predicate separated by the dot operator. This hierarchical naming model facilitates easy extension to new protocols. Consider the IP protocol example shown below.

Diagram 8: Protocol Sample: IP

```
protocol ip {
    vers         { (ip[0:1] & 0xf0) >> 4 }
    hlength      { ip[0:1] & 0x0f }
    hlength_b    { hlength << 2 }
    tos          { ip[1:1] }
    length       { ip[2:2] }
    id           { ip[4:2] }
    flags        { (ip[6:1] & 0xe0) >> 5 }
    fragoffset   { ip[6:2] & 0x1fff }
    ttl          { ip[8:1] }
    proto        { ip[9:1] }
    chksum       { ip[10:2] }
    src          { ip[12:4] }
    dst          { ip[16:4] }
    intrinsic chksumvalid  {}
    intrinsic genchksum {}
    predicate bcast    { dst == 255.255.255.255 }
    predicate mcast    { (dst & 0xf0000000) == 0xe0000000 }
    predicate frag     { fragoffset != 0 || (flags & 2) != 0 }
    demux {
        (proto == 6)    { tcp at hlength_b }
        (proto == 17)   { udp at hlength_b }
        (proto == 1)    { icmp at hlength_b }
        (proto == 2)    { igmp at hlength_b }
```

Diagram 8: Protocol Sample: IP

```
        default         { unknownIP at hlength_b }
    }
}
```

Here, ip is the protocol name being defined. The protocol definition includes a number of fields which correspond to portions of the IP header comprising one or more bytes. The fields vers, hlength, flags and fragoffset have special operations that extract certain bits from the IP header. hlength_b holds the length of the header in bytes computed using the hlength field (which is in units of 32-bit words).

bcast, mcast, and frag are predicates which may be useful in defining other rules or predicates. Predicates are defined in Section 7.

This protocol demuxes into four other protocols, excluding the default, under different conditions. In this example, the demultiplexing key is the protocol type specified by the value of the IP proto field. All the protocols are activated at offset hlength_b relative to the start of the IP header.

When a protocol is activated due to the processing of a lower-layer demux statement, the activated protocol's name becomes a Boolean that evaluates true (it is otherwise false). Thus, if the IP protocol is activated, the expression ip will evaluate to a true Boolean expression. The fields and predicates in a protocol are accessed by specifying the protocol and the field, predicate or intrinsic separated by the dot operator. For example:

Diagram 9: Sample references

```
ip.length
ip.bcast
ip.chksumvalid
```

Users can provide additional declarations for new fields, predicates and demux cases by extending previously-defined protocol elements. Any name conflicts will be resolved by using the newest definitions. This allows user-provided definitions to override system-supplied definitions updates and migration. The syntax for extensions is the protocol name followed by the new element separated by the dot (.) operator. Following the name is the definition enclosed in delimiters as illustrated below:

Diagram 10: Sample protocol extension

```
xx.newfield { xx[10:4] }
predicate xx.newpred { xx[8:2] != 10 }
xx.demux {
    (xx[6:2] == 5) { newproto at 20 }
}
```

In the first example, a new field called newfield is declared for the protocol xx. In the second, a new predicate called newpred is defined for the protocol xx. In the third example, a new higher-layer protocol newproto is declared as a demultiplexing for the protocol xx. The root of the protocol hierarchy is the reserved protocol frame, which refers to the received data from the link-layer. The redefinition of the protocol frame is not allowed for any protocol definitions, but new protocol demux opertions can be added to it.

The intrinsics provided are listed in Table 28:

TABLE 28

List of intrinsics

| Intrinsic Name | Functionality |
|---|---|
| ip.chksumvalid | Check the validity of the ip header checksum, return boolean value |
| tcp.chksumvalid | Check the validity of the tcp pseudo checksum, return boolean value |
| udp.chksumvalid | Check the validity of udp pseudo checksum, return boolean value |

7. Predicates

Predicates are named Boolean expressions that use protocol header fields, other Boolean expressions, and previously-defined predicates as operands. The syntax for predicates is as follows:

predicate predicate_name { boolean_expression }

For example, predicate isTcpSyn { tcp && (tcp.flags & 0x02) != 0 }
  predicate isNewTelnet { isTcpSyn && (tcp.dport == 23) }

In the second example, the predicate isTcpSyn is used in the expression to evaluate the predicate isNewTelnet.

8. Sets

The language supports the notion of sets and named searches on sets, which can be used to efficiently check whether a packet should be considered a member of some application-defined equivalence class. Using sets, classification rules requiring persistent state may be constructed. The classification language only supports the evaluation of set membership; modification to the contents of the sets are handled exclusively by actions in conjunction with the ASL. A named search defines a particular search on a set and its name may be used as a Boolean variable in subsequent Boolean expressions. Named searches are used to tie pre-computed lookup results calculated in the classification phase to actions executing in the action phase.

A set is defined using the keyword set followed by an identifier specifying the name of the set. The number of keys for any search on the set is specified following the name, between < and >. A set definition may optionally include a hint as to the expected number of members of the set, specified using the keyword size_hint. The syntax is as follows:

Diagram 11: Declaring a set

```
set set_name < nkeys > {
    size_hint { expected_population }
}
```

The size_hint does not place a strict limit on the population of the set, but as the set size grows beyond the hint value, the search time may slowly increase.

Predicates and rules may perform named searches (see the following section for a discussion of rules). Named searches are specified using the keyword search followed by the search name and search keys. The search name consists of two parts: the name of the set to search, and the name of the search being defined. The keys may refer to arbitrary expressions, but typically refer to fields in protocols. The number of keys defined in the named search must match the number of keys defined for the set. The named search may be used in subsequent predicates as a Boolean value, where "true" indicates a record is present in the associated set with the specified keys. An optional Boolean expression may be included in a named search using the requires keyword. If the Boolean expression fails to evaluate true, the search result is always "false". The syntax for named searches is as follows:

---
Diagram 12: Named search

---
```
search set_name.search_name (key1, key2) {
    requires { boolean_expression }
}
```
---

Consider the following example defining a set of transport-layer protocol ports (tcp or udp):

---
Diagram 13: Sharing a set definition

---
```
#define MAX_ICP_UDP_PORTS_SET_SZ   200
/* TUPORTS: a set of TCP or UDP ports */
set tuports<1> {
    size_hint { MAX_TCP_UDP_PORTS_SET_SZ }
}
search tuports.tcp_sport (tcp.sport)
search tuports.tcp_dport (tcp.dport)
search tuports.udp_sport (udp.sport)
search tuports.udp_dport (udp.dport)
```
---

This example illustrates how one set may be used by multiple searches. The set tuports might contain a collection of port numbers of interest for either protocol, TCP/IP or UDP/IP. The four named searches provide checks as to whether different TCP or UDP source or destination port numbers are present in the set. The results of named searches may be used as Boolean values in expressions, as illustrated below:

---
Diagram 14: Using shared sets

---
```
predicate tcp_sport_in {tuports.tcp_sport}
predicate tcp_port_in {tuports.tcp_sport && tuports.tcp_dport }
predicate udp_sdports_in {
    tuports.udp_sport ||tuports.udp_dport
}
```
---

In the first example, a predicate tcp_sport_in is defined to be the Boolean result of the named search tuports.tcp_sport, which determines whether or not the tcp.sport field (source port) of a TCP segment is in the set tuports. In the second example, both the source and destination ports of the TCP protocol header are searched using named searches. In the third case, membership of either the source or destination ports of a UDP datagram in the set is determined.

9. Rules and Actions

Rules are a named combination of a predicate and action. They are defined using the keyword rule. The predicate portion is a Boolean expression consisting of any combination of individual Boolean subexpressions or other predicate names. The Boolean value of a predicate name corresponds to the Boolean value of its associated predicate portion. The action portion specifies the name of the action which is to be invoked when the predicate portion evaluates "true" for the current frame. Actions are implemented external to the classifier and supplied by application developers. Arguments can be specified for the action function and may include predicates, named searches on sets, or results of intrinsic functions. The following illustrates the syntax:

---
Diagram 15: Rule syntax

---
```
rule rule_name { predicate } {
    external_action_func (arg1, arg2, . . . )
}
```
---

The argument list defines the values passed to the action code executed externally to NCL. An arbitrary number of arguments are supported.

---
Diagram 16: Telnet/FTP example

---
```
set set_ip_tcp_ports <3> {
    size_hint { 100 }
}
set set_ip_udp_ports <3> {
    size_hint { 100 }
}
search set_ip_tcp_ports.tcp_dport ( ip.src, ip.dst, tcp.dport ) {
    requires {ip && tcp}
}
search set_ip_udp_ports.udp_dport ( ip.src, ip.dst, udp.dport ) {
    requires {ip && udp}
}
predicate ipValid { ip && ip.chksumvalid && (ip.hlen > 5) &&
    (ip.ver == 4) }
predicate newtelnet { (tcp.flags & 0x02) && (tcp.dport == 23) }
predicate tftp { (udp.dport == 21) && set_ip_udp_ports.udp_ports }
rule telnetNewCon { ipValid && newtelnet && 10 set_ip_tcp_
ports.tcp_dport }
    { start_telnet( set_ip_tcp_ports.tcp_dport) }
rule tftppkt { ipValid && tftp }
    { is_tftp_pkt ( udp.dport) }
rule addnewtelnet { newtelnet }
    { add_to_tcp_pkt_count( ) }
```
---

In the above example, two sets are defined. One contains source and destination IP addresses, plus TCP ports. The other set contains IP addresses and UDP ports. Two named searches are defined. The first search uses the IP source and destination addresses and the TCP destination port number as keys. The second search uses the IP source and destination addresses and UDP destination port as keys. The predicate ipValid checks to make sure the packet is an IP packet with valid checksum, has a header of acceptable size, and is IP version 4. The predicate newtelnet determines if the current TCP segment is a SYN packet destined for a telnet port. The predicate tftp determines if the UDP destination port corresponds to the TFTP port number and the combination of IP source and destination addresses and destination UDP port number is in the set ip_udp_ports. The rule telnetNewCon determines if the current segment is a new telnet connection, and specifies that the associated external function start_telnet will be invoked when this rule is true. The function takes the search result as argument. The rule tftppkt checks whether the packet belongs to a TFTP association. If so, the associated action is_tftp_pkt will be invoked with udp.dport as the argument. The third checks if the current segment is a new telnet connection and defines the associated action function add_to_tcp_pkt_count.

10. With Clauses

A with clause is a special directive providing for conditional execution of a group of rules or predicates. The syntax is as follows:

---
Diagram 17: With clause syntax sample
---
```
with boolean_expression {
    predicate pred_name { any_boolean_exp }
    rule rule_name { any_boolean_exp } { action_reference }
}
```
---

If the Boolean expression in the with clause evaluates false, all the enclosed predicates and rules evaluate false. For example, if we want to evaluate the validity of an IP datagram and use it in a set of predicates and rules, these can be encapsulated using the with clause and a conditional, which could be the checksum of the IP header. Nested with clauses are allowed, as illustrated in the following example:

---
Diagram 18: Nested with clauses
---
```
predicate tcpValid { tcp && tcp.chksumalid }
#define TELNET    23   // port number for telnet
with ipValid {
    predicate tftp         { (udp.dport == 21) &&
                              ip_udp_ports.udp_dport }
    with tcpValid {        /* Nested with */
        predicate newtelnet    { (tcp.flags & 0x02) &&
                                  tcp.dport == TELNET }
        rule telnetNewCon { newtelnet && ip_tcp_ports.tcp_dport }
            { start_telnet ( ip_tcp_sport.tcp_dport) }
    }
    rule tftppkt { tftp && ip_udp_ports.udp_dport }
        { is_tftp_pkt ( udp.dport ) }
}
```
---

11. Protocol Definitions for TCP/IP

The following NCL definitions are used for processing of TCP/IP and related protocols.

```
/*************************** FRAME (base unit) ***************************/
protocol frame {
// status words written by NetBoost Ethernet MACs
    rxstatus         { frame[0x180:4] } // receive status
    rxstamp          { frame[0x184:4] } // receive time stamp
    txstatus         { frame[0x188:4] } // xmit status (if sent out)
    txstamp          { frame[0x18C:4] } // xmit time stamp (if sent)
    predicate rxerror    { (rxstatus & 0x80000000) }
        length           { (rxstatus & 0x07FF0000) >> 16 } // frame len
        source           { (rxstatus & 0x00000F00) >> 8 } // hardware origin
        offset           { (rxstatus & 0x000000FF) }     // start of frame
    predicate  txok      { (txstatus & 0x80000000) != 0 } // tx success
    demux {
        rxerror      { frame_bad at 0 }
        // source 0: NetBoost onboard MAC A ethernet packet
        // source 1: NetBoost onboard MAC B ethernet packet
        // source 2: Other rxstatus-encodable ethernet packet
        (source < 3)   { ether at 0x180 + offset }
        default        { frame_bad at 0 }
    }
}
protocol frame_bad {
}
/*************************** ETHERNET ***************************/
#define ETHER_IPTYPE0x0800
#define ETHER_ARPTYPE      0x0806
#define ETHER_RARPTYPE    0x8035
protocol ether {
    dst       { ether[0:6] }   // source ethernet address
    src       { ether[6:6] }   // destination ethernet address
    typelen   { ether[12:2] }       // length or type, depends on encap
    snap    { ether[14:6] }    // SNAP code if present
    type     { ether[20:2] }    // type for 8023 encaps
    // We are only interested in a specific subset of the possible
    // 802.3 encapsulations; specifically, those where the 802.2 LLC area
    // contains DSAP=0xAA, SSAP=0xAA, and CNTL=0x03; followed by
    // the 802.2 SNAP ar3ea contains the ORG code 0x000000. In this
    // case, the 7802.2 SNAP "type" field contains one of our ETHER
    // type values defined above.
    predicate  issnap { (typelen <= 1500) && (snap == 0xAAAA03000000) }
                offset  { 14 + (issnap << 3) }
    demux {
        typelen == ETHER_ARPTYPE              { arp at offset }
        typelen == ETHER_RARPTYPE             { arp at offset }
        typelen == ETHER_IPTYPE                { ip at offset }
        issnap && (type == ETHER_ARPTYPE)     { arp at offset }
        issnap && (type == ETHER_RARPTYPE)    { arp at offset }
```

```
        issnap && (type == ETHER_IPTYPE)        { ip at offset }
        default                                  { ether_bad at 0 }
    }
}
protocol ether_bad {
}
/***************** ARP PROTOCOL ********************/
#define ARPHRD_ETHER        1       /* ethernet hardware format */
#define ARPHRD_FRELAY       15      /* frame relay hardware format */
#define ARPOP_REQUEST       1       /* request to resolve address */
#define ARPOP_REPLY         2       /* response to previous request */
#define ARPOP_REVREQUEST    3       /* request protocol address given hardware */
#define ARPOP_REVREPLY      4       /* response giving protocol address */
#define ARPOP_INVREQUEST    8       /* request to identify peer */
#define ARPOP_INVREPLY      9       /* response identifying peer */
protocol arp {
    htype       { arp[0:2] }
    ptype       { arp[2:2] }
    hsize       { arp[4:1] }
    psize       { arp[5:1] }
    op          { arp[6:2] }
    varhdr      { 8 }
    predicate   ethip4   { (op <= ARPOP_REVREPLY) && (htype == ARPHRD_ETHER) &&
                           (ptype == ETHER_IPTYPE) && (hsize == 6) && (psize == 4) }
    demux {
        ethip4              { ether_ip4_arp at varhdr }
        default             { unimpl_arp at 0 }
    }
}
protocol unimpl_arp {
}
protocol ether_ip4_arp {
    shaddr              { ether_ip4_arp[0:6] }
    spaddr              { ether_ip4_arp[6:4] }
    thaddr      { ether_ip4_arp[10:6] }
    tpaddr      { ether_ip4_arp[16:4] }
}
/********************* IP v4 ********************/
protocol ip {
    verhl       { ip[0:1] }
        ver     { (verhl & 0xf0) >> 4 }
        hl      { (verhl & 0x0f) }
        hlen    { hl << 2 }
    tos         { ip[1:1] }
    length      { ip[2:2] }
    id          { ip[4:2] }
    ffo         { ip[6:2] }
        flags   { (ffo & 0xe000) >> 13 }
        fragoff { (ffo & 0x1fff) }
    ttl         { ip[8:1] }
    proto       { ip[9:1] }
    cksum       { ip[10:2] }
    src         { ip[12:4] }
    dst         { ip[16:4] }
    // varible length options start at offset 20
    predicate   dbcast { dst == 255.255.255.255 }
    predicate   sbcast { src == 255.255.255.255 }
    predicate   smcast { (src & 0xF0000000) == 0xE0000000 }
    predicate   dmcast { (dst & 0xF0000000) == 0xE0000000 }
    predicate   dontfr { (flags & 2) != 0 }     // "do not fragment this packet"
    predicate   morefr { (flags & 1) != 0 }     // "not last frag in datagram"
    predicate   isfrag { morefr || fragoff }
    predicate   options { hlen > 20 }
    intrinsic   chksumvalid {}
    predicate   okhwlen { (frame.length − ether.offset) >= length }
    predicate   invalid { (ver != 4) || (hlen < 20) ||
                          ((frame.length − ether.offset) < length) ||
                          (length < hlen) || !chksumvalid }
    predicate   badsrc   { sbcast || smcast }
    demux {
        // Demux expressions are evaluated in order, and the
        // first one that matches causes a demux to the protocol;
        // once one matches, no further checks are made, so the
        // cases do not have to be precisely mutually exclusive.
        invalid         { ip_bad at 0 }
        badsrc          { ip_badsrc at 0 }
        (proto == 1)    { icmp at hlen }
        (proto == 2)    { igmp at hlen }
        (proto == 6)    { tcp at hlen }
```

```
        (proto == 17)    { udp at hlen }
        default          { ip_unknown_transport at hlen }
      }
   }
   protocol ip_bad {
   }
   protocol ip_badsrc {
   }
   protocol ip_unknown_transport {
   }
   /********************** UDP *********************************/
   protocol udp {
      sport       { udp[0:2] }
      dport       { udp[2:2] }
      length      { udp[4:2] }
      cksum       { udp[6:2] }
      intrinsic   chksumvalid    { } /* undefined if a frag */
      predicate   valid          { ip.isfrag || chksumvalid }
   }
   /********************** TCP *********************************/
   protocol tcp {
      sport       { tcp[0:2] }
      dport       { tcp[2:2] }
      seq         { tcp[4:4] }
      ack         { tcp[8:4] }
      hlf         { tcp[12:2] }
            hl    { (hlf & 0xf000) >> 12 }
            hlen  { hl << 2 }
            flags { (hlf & 0x003f) }
      win         { tcp[14:2] }
      cksum       { tcp[16:2] }
      urp         { tcp[18:2] }
      intrinsic   chksumvalid { } /* undefined if IP Fragment */
      predicate   valid        { ip.isfrag || ((hlen >= 20) && chksumvalid) }
      predicate   opt_present  { hlen > 20 }
   }
   /********************** ICMP ********************************/
   protocol icmp {
      type        { icmp[0:1] }
      code        { icmp[1:1] }
      cksum       { icmp[2:2] }
   }
   /********************** IGMP ********************************/
   protocol igmp {
      vertype     { igmp[0:1] }
            ver   { (vertype & 0xf0) >> 4 }
            type  { (vertype & 0x0f) }
      reserved    { igmp[1:1] }
      cksum       { igmp[2:2] }
      group       { igmp[4:4] }
   }
```

ASL

The Application Services Library (ASL) provides a set of library functions available to action code that are useful for packet processing. The complete environment available to action code includes: the ASL; a restricted C/C++ library and runtime environment; one or more domain specific extensions such as TCP/IP.

The Restricted C/C++ Libraries and Runtime Environment

Action code may be implemented in either the ANSI C or C++ programming languages. A library supporting most of the functions defined in the ANSI C and C++ libraries is provided. These libraries are customized for the NetBoost PE hardware environment, and as such differ slightly from their equivalents in a standard host operating system. Most notably, file operations are restricted to the standard error and output streams (which are mapped into upcalls).

In addition to the C and C++ libraries available to action code, NetBoost supplies a specialized C and C++ runtime initialization object module which sets up the C and C++ run-time environments by initializing the set of environment variables and, in the case of C++, executing constructors for static objects.

1. ASL Functions

The ASL contains class definitions of potential use to any action code executing in the PE. It includes memory allocation, management of API objects (ACEs, targets), upcall/downcall support, set manipulation, timers, and a namespace support facility. The components comprising the ASL library are as follows:

Basic Scalar Types

The library contains basic type definitions that include the number of bits represented. These include int8 (8 bit integers), int16 (16 bit integers), int32 (32 bit integers), and int64 (64 bit integers). In addition, unsigned values (uint8, uint16, uint32, uint64) are also supported.

Special Endian-Sensitive Scalar Types

The ASL is commonly used for manipulating the contents of packets which are generally in network byte order. The ASL provides type definitions similar to the basic scalar types, but which represent data in network byte order. Types in network byte order as declared in the same fashion as the basic scalar types but with a leading n prefix (e.g. nuint16 refers to an unsigned 16 bit quantity in network byte order). The following functions are used to convert between the basic types (host order) and the network order types:

uint32 ntohl(nuint32 n); // network to host (32 bit)
   uint16 ntohs(nuint16 n); // network to host (16 bit)
   nuint32 htonl(uint32 h); // host to network (32 bit)
   nuint16 htons(uint16 h); // host to network (16 bit)

Macros and Classes for Handling Errors and Exceptions in the ASL

The ASL contains a number of C/C++ macro definitions used to aid in debugging and code development (and mark fatal error conditions). These are listed below:

ASSERT Macros (asserts boolean expression, halts on failure)

CHECK Macros (asserts boolean, returns from current real-time loop on failure)

STUB Macros (gives message, c++ file name and line number)

SHO Macros (used to monitor value of a variable/expression during execution)

Exceptions

The ASL contains a number of functions available for use as exception handlers. Exceptions are a programming construct used to delivery error information up the call stack. The following functions are provided for handling exceptions:

NBaction_err and NBaction_warn functions to be invoked when exceptions are thrown.

OnError class, used to invoke functions during exception handling, mostly for debugger breakpoints.

ACE Support

Ace objects in the ASL contain the per-Ace state information. To facilitate common operations, the base Ace class' pass and drop targets are provided by the base class and built when an Ace instance is constructed. If no write action is taken on a buffer that arrives at the Ace (i.e. none of the actions of matching rules indicates it took ownership), the buffer is sent to the pass target. The pass and drop functions (i.e. target take functions, below) may be used directly as actions within the NCL application description, or they may be called by other actions. Member functions of the Ace class include: pass( ), drop( ), enaRule( )—enable a rule, disRule( )—disable a rule.

Action Support:

The init_act ions call is the primary entry point into the application's Action code. It is used by the ASL startup code to initialize the PE portion of the Network Application. It is responsible for constructing an Ace object of the proper class, and typically does nothing else. Example syntax:

INITF init_actions(void* id, char* name, Image* obj)

```
    {
        return new ExampleAce(id, name, obj);
    }
```

The function should return a pointer to an object Subclassed from the Ace class, or a NULL pointer if an Ace could not be constructed. Throwing an NBaction_err or NBaction_ warn exception may also be appropriate and will be caught by the initialization code. Error conditions will be reported back to the Resolver as a failure to create the Ace.

Return Values from Action Code/Handlers

When a rule's action portion is invoked because the rule predication portion evaluated true, the action function must return a code indicating how processing should proceed. The action may return a code indicating it has disposed of the frame (ending the classification phase), or it may indicate it did not dispose of the frame, and further classification (rule evaluations) should continue. A final option available is for the action to return a defer code, indicating that it wishes to modify a frame, but that the frame is in use elsewhere. The return values are defined as C/C++ pre-processor definitions:

define RULE_DONE . . .

Actions should return RULE_DONE to terminate processing of rules and actions within the context of the current Ace; for instance, when a buffer has been sent to a target, or stored for later processing.

define RULE_CONT . . .

Actions should return RULE_CONT if they have merely observed the buffer and wish for additional rules and actions within the context of the current ace to be processed.

define RULE_DEFER . . .

Actions should return RULE_DEFER if they wish to modify a packet within a buffer but the buffer notes that the packet is currently busy elsewhere.

Predefined Actions

The common cases of disposing of a frame by either dropping it or sending it on to the next classification entity for processing is supported by two helper functions available to NCL code and result in calling the functions Ace::pass( ) or Ace::drop( ) within the ASL: action_pass (predefined action), passes frame to 'pass target', always returns RULE_DONE action_drop (predefined action), passes frame to 'drop target', always returns RULE_DONE User-Defined Actions Most often, user-defined actions are used in an Ace. Such actions are implemented with the following calling structure.

The ACTNF return type is used to set up linkage. Action handlers take two arguments: pointer to the current buffer being processed, and the Ace associated with this action. Example:

```
ACTNF do_mcast(Buffer *buf, ExAce *ace) {
    ace->mcast_ct ++;
    cout << ace->name( ) << ": " << ace->mcast_ct << endl;
    return ace->drop(buf);
}
```

Thus, the Buffer* and ExAce* types are passed to the handler. In this case, ExAce is derived from the base Ace class:

```
#include "NBaction/NBaction.h"
class ExAce : public Ace {
public:
    ExAce(ModuleId id, char *name, Image *obj)
    : Ace(id, name, obj), mcast_ct(0) { }
    int mcast_ct;
```

```
};
    INITF init_actions(void *id, char *name, Image *obj) {
        return new ExAce(id, name, obj);
    }
```

Buffer Management (Buffer Class)

The basic unit of processing in the ASL is the Buffer. All data received from the network is received in buffers, and all data to be transmitted must be properly formatted into buffers. Buffers are reference-counted. Contents are typed (more specifically, the type of the first header has a certain type [an integer/enumerated type]). Member functions of the Buffer class support common trimming operations (trim head, trim tail) plus additions (prepend and append date). Buffers are assigned a time stamp upon arrival and departure (if they are transmitted). The member function rxTime( ) returns receipt time stamp of the frame contained in the buffer. The txTime( ) gives transmission complete time stamp of the buffer if the frame it contains has been transmitted. Several additional member functions and operators are supported: new( )—allocates buffer from pool structure (see below), headerBase( )—location of first network header, headerOffset( )—reference to byte offset from start of storage to first network header, packetSize( )—number of bytes in frame, headerType( )—type of first header, packet PadHeadSize( )—free space before net packet, packetPadTailSize( )—free space after net packet, prepend( )—add data to beginning, append( )—add data to end, trim_head( )—remove data from head, trim_tail( )—remove data from end, {rx, tx} Time( )—see above, next( )—reference to next buffer on chain, incref( )—bump reference count, decref( )—decrement reference count, busy( )—indicates buffer being processed, log( )—allows for adding info the 'transaction log' of a buffer which can indicate what has processed it.

Targets

Target objects within an Ace indicate the next hardware or software resource that will classify a buffer along a selected path. Targets are bound to another Ace within the same application, an Ace within a different application, or a built in resource such as decryption. Bindings for Targets are set up by the plumber (see above). The class includes the member function take( ) which sends a buffer to the next downstream entity for classification.

Targets have an associated module and Ace (specified by a "ModuleId" object and an Ace*). They also have a name in the name space contained in the resolver, which associates Aces to applications.

Upcall

An upcall is a form of procedure call initiated in the PE module and handled in the AP module. Upcalls provide communication between the "inline" portion of an application and its "slower path" executing in the host environment. Within the ASL, the upcall facility sends messages to the AP. Messages are defined below. The upcall class contains the member function call( )—which takes objects of type Message* and sends them asynchronously to AP module.

DowncallHandler

A downcall is a form of procedure call initiated in the AP module and handled in the PE module. Downcalls provide the opposite direction of communication than upcalls. The class contains the member function direct( ) which provides a pointer to the member function of the Ace class that is to be invoked when the associated downcall is requested in the AP. The Ace member function pointed to takes a Message * type as argument.

Message

Messages contain zero, one, or two blocks of message data, which are independently constructed using the MessageBlock constructors (below). Uninitialized blocks will appear at the Upcall handler in the AP module as zero length messages. Member functions of the Message class include: msg1( ), msg2( ), len1( ), len2( )—returns addresses and lengths of the messages [if present]. Other member functions: clr1( ), clr2( ), done( )—acknowledge receipt of a message and free resources.

MessageBlock

The MessageBlock class is used to encapsulate a region of storage within the Policy Engine memory that will be used in a future Upcall Message. It also includes a method to be called when the service software has copied the data out of that storage and no longer needs it to be stable (and can allow it to be recycled). Constructor syntax is as follows:

```
MessageBlock(char *msg, int len=0, DoneFp done=0);
MessageBlock(Buffer *buf);
MessageBlock(int len, int off=0);
```

The first form specifies an existing data area to be used as the data source. If the completion callback function (DoneFp) is specified, it will be called when the data has been copied out of the source area. Otherwise, no callback is made and no special actions are taken after the data is copied out of the message block. If no length is specified, then the base pointer is assumed to point to a zero-terminated string; the length is calculated to include the null termination. The second form specifies a Buffer object; the data transferred is the data contained within the buffer, and the relative alignment of the data within the 32-bit word is retained. The reference count on the buffer is incremented when the MessageBlock is created, and the callback function is set to decrement the reference count when the copy out is complete. This will have the effect of marking the packet as "busy" for any actions that check for busy buffers, as well as preventing the buffer from being recycled before the copy out is complete. The third form requests that MessageBlock handle dynamic allocation of a region of memory large enough to hold a message of a specified size. Optionally, a second parameter can be specified that gives the offset from the 32-bit word alignment boundary where the data should start. The data block will retain this relative byte offset throughout its transfer to the Application Processor. This allows, for instance, allocating a 1514-byte data area with 2-byte offset, building an Ethernet frame within it, and having any IP headers included in the packet land properly aligned on 32-bit alignment boundaries.

Sets

Sets are an efficient way to track a large number of equivalence classes of packets, so that state can be kept for all packets that have the same values in specific fields. For instance, the programmer might wish to count the number of packets that flow between any two specific IP address pairs, or keep state for each TCP stream. Sets represent collections of individual members, each one of which matches buffers with a specific combination of field values. If the programmer instead wishes to form sets of the form "the set of all packets with IP header lengths greater than twenty bytes," then the present form of sets are not appropriate; instead, a Classification Predicate should be used.

In NCL, the only information available regarding a set is whether or not a set contained a record corresponding to a vector of search keys. Within the ASL, all other set operations are supported: searches, insertions, and removals. For searches conducted in the CE, the ASL provides access to additional information obtained during the search operation: specifically, a pointer to the actual element located (for successful searches), and other helpful information such as an insertion pointer (on failure). The actual elements stored in each set are of a class constructed by the compiler, or are of a class that the software vendor has subclassed from that class. The hardware environment places strict requirements on the alignment modulus and alignment offset for each set element.

As shown in the NCL specification, a single set may be searched by several vectors of keys, resulting in multiple search results that share the same target element records. Each of these directives results in the construction of a function that fills the key fields of the suitable Element subclass from a buffer.

Within the ASL, the class set is used to abstract a set. It serves as a base class for compiler generated classes specific to the sets specified in the NCL program (see below).

Search

The Search class is the data type returned by all set searching operations, whether provided directly by the ASL or executed within the classification engine. Member functions: ran( )—true if the CE executed this search on a set, hit( )—true if the CE found a match using this search, miss( )—inverse of hit( ) but can return a cookie making inserts faster, toElement( )—converts successful search result to underlying object, insert( )—insert an object at the place the miss( ) function indicates we should.

Element

Contents of sets are called elements, and the NCL compiler generates a collection of specialized classes derived from the Element base class to contain user-specified data within set elements. Set elements may have an associated timeout value, indicating the maximum amount of time the set element should be maintained. After the time out is reached, the set element is automatically removed from the set. The time out facility is useful for monitoring network activity such as packet flows that should eventually be cleared due to inactivity.

Compiler-Generated Elt_<setname> Classes

For each set directive in the NCL program, the NCL compiler produces an adjusted subclass of the Element class called Elt_<setname>, substituting the name of the set for <setname>. This class is used to define the type of elements of the specified set. Because each set declaration contains the number of keys needed to search the set, this compiler-generated class is specialized from the element base class for the number of words of search key being used.

Compiler-Generated Set_<setname> Classes

For each set directive in the NCL program, the NCL compiler produces an adjusted subclass of the Element class called Set_<setname>, substituting the name of the set for <setname>. This class is used to define the lookup functions of the specified set. The NCL compiler uses the number of words of key information to customize the parameter list for the lookup function; the NCL size_hint is used to adjust a protected field within the class. Aces that needing to manipulate sets should include an object of the customized Set class as a member of their Ace.

Events

The Event class provides for execution of functions at arbitrary times in the future, with efficient rescheduling of the event and the ability to cancel an event without destroying the event marker itself. A calendar queue is used to implement the event mechanism. When constructing objects of the Event class, two optional parameters may be specified: the function to be called (which must be a member function of a class based on Event), and an initial scheduled time (how long in the future, expressed as a Time object). When both parameters are specified, the event's service function is set and the event is scheduled. If the Time parameter is not specified, the Event's service function is still set but the event is not scheduled. If the service function is not set, it is assumed that the event will be directed to a service function before it is scheduled in the future. Member functions of this class include: direct( )—specifies what function to be executed at expiry, schedule( )—indicates how far in the future for event to trigger, cancel( )—unschedule event, curr( )—get time of currently running event.

Rate

The Rate class provides a simple way to track event rates and bandwidths in order to watch for rates exceeding desired values. The Rate constructor allows the application to specify arbitrary sampling periods. The application can (optionally) specify how finely to divide the sampling period. Larger divisors result in more precise rate measurement but require more overhead, since the Rate object schedules Events for each of the shorter periods while there are events within the longer period. Member functions of this class include: clear( )—reset internal state, add( )—bumps event count, count( )—gives best estimate of current trailing rate of events over last/longer period Time The Time class provides a common format for carrying around a time value. Absolute, relative, and elapsed times are all handled identically. As conversions to and from int64 (a sixty-four bit unsigned integer value) are provided, all scalar operators are available for use; in addition, the assignment operators are explicitly provided. Various other classes use Time objects to specify absolute times and time intervals. For maximum future flexibility in selection of storage formats, the actual units of the scalar time value are not specified; instead, they are stored as a class variable. Extraction of meaningful data should be done via the appropriate access methods rather than by direct arithmetic on the Time object.

Class methods are available to construct Time objects for specified numbers of standard time units (microseconds, milliseconds, seconds, minutes, hours, days and weeks); also, methods are provided for extraction of those standard time periods from any Time object. Member functions include: curr( )—returns current real time, operators: +=, −=, *=, /=, %=, <<=, >>=, |=, ˆ=, &=, accessors+builders: usec( ), msec( ), secs( ), mins( ), hour( ), days( ), week( ), which access or build Time objects using the specified number of microseconds, milliseconds, seconds, minutes, hours, days, and weeks, respectively.

Memory Pool

The Pool class provides a mechanism for fast allocation of objects of fixed sizes at specified offsets from specified power-of-two alignments, restocking the raw memory resources from the PE module memory pool as required. The constructor creates an object that describes the contents of the memory pool and contains the configuration control information for how future allocations will be handled.

Special 'offset' and 'restock' parameters are used. The offset parameter allows allocation of classes where a specific member needs to be strongly aligned; for example, objects from the Buffer class contain an element called hard that must start at the beginning of a 2048-byte-aligned region. The restock parameter controls how much memory is allocated from the surrounding environment when the pool is empty. Enough memory is allocated to contain at least the requested number of objects, of the specified size, at the specified offset from the alignment modulus. Member function include: take( )—allocate a chunk, free( )—return a chunk to the pool.

Tagged Memory Pool

Objects that carry with them a reference back to the pool from which they were taken are called tagged. This is most useful for cases when the code that frees the object will not necessarily know what pool it came from. This class is similar to normal Memory Pools, except for internal details and the calling sequence for freeing objects back into the pool. The tagged class trades some additional space overhead for the flexibility of being able to free objects without knowing which Tagged pool they came from; this is similar to the overhead required by most C library malloc implementations. If the object has strong alignment requirements, the single added word of overhead could cause much space to be wasted between the objects. For instance, if the objects were 32 bytes long and were required to start on 32-byte boundaries, the additional word would cause another 28 bytes of padding to be wasted between adjacent objects.

The Tagged class adds a second (static) version of the take method, which is passed the size of the object to be allocated. The Tagged class manages an appropriate set of pools based on possible object sizes, grouping objects of similar size together to limit the number of pools and allow sharing of real memory between objects of slightly different sizes. Member functions include: take( )—allocate a chunk, free( )—return a chunk to the pool.

Dynamic

This class takes care of overloading the new and delete operators, redirecting the memory allocation to use a number of Tagged Pools managed by the NBACTION DLL. All classes derived from Dynamic share the same set of Tagged Pools; each pool handles a specific range of object sizes, and objects of similar sizes will share the same Tagged Pool. The dynamic class has no storage requirements and no virtual functions. Thus, declaring objects derived from Dynamic will not change the size or layout of your objects (just how they are allocated). Operators defined include: new( )—allocate object from underlying pool, delete( )—return to underlying pool.

Name Dictionary

The Name class keeps a database of named objects (that are arbitrary pointers in the memory address space of the ASL. It provides mechanisms for adding objects to the dictionary, finding objects by name, and removing them from the dictionary. It is implemented with a Patricia Tree (a structure often used in longest prefix match in routing table lookups). Member functions include: find( )—look up string, name( )—return name of dictionary.

2. ASL Extensions for TCP/IP

The TCP/IP Extensions to the Action Services Library (ASL) provides a set of class definitions designed to make several tasks common to TCP/IP-based network-oriented applications easier. With functions spanning several protocol layers, it includes operations such as IP fragment reassembly and TCP stream reconstruction. Note that many of the functions that handle Internet data make use of 16 and 32-bit data types beginning with 'n' (such as nuint16 and nuint32). These data types refer to data in network byte order (i.e. big endian). Functions used to convert between host and network byte such as htonl( ) (which converts a 32-bit word from host to network byte order), are also defined.

3. The Internet Class

Functions of potential use to any Internet application are grouped together as methods of the Internet class. These functions are declared static within the class, so that they may be used easily without requiring an instantiation of the Internet class.

Internet Checksum Support

The Internet Checksum is used extensively within the TCP/IP protocols to provide reasonably high assurance that data has been delivered correctly. In particular, it is used in IP (for headers), TCP and UDP (for headers and data), ICMP (for headers and data), and IGMP (for headers).

The Internet checksum is defined to be the 1's complement of the sum of a region of data, where the sum is computed using 16-bit words and 1's complement addition.

Computation of this checksum is documented in a number of RFCs (available from ftp://ds.internic.net/rfc): RFC 1936 describes a hardware implementation, RFC 1624 and RFC 1141 describe incremental updates, RFC 1071 describes a number of mathematical properties of the checksum and how to compute it quickly. RFC 1071 also includes a copy of IEN 45 (from 1978), which describes motivations for the design of the checksum.

The ASL provides the following functions to calculate Internet Checksums:

cksum

Description

Computes the Internet Checksum of the data specified. This function works properly for data aligned to any byte boundary, but may perform (significantly) better for 32-bit aligned data.

Syntax static nuint16 Internet::cksum(u_char* base, int len);

Parameters

| Parameter | Type | Description |
| --- | --- | --- |
| base | unsigned char* | The starting address of the data. |
| len | int | The number of bytes of data. |

Return Value

Returns the Internet Checksum in the same byte order as the underlying data, which is assumed to be in network byte order (big endian).

psum

Description

Computes the 2's-complement sum of a region of data taken as 16-bit words. The Internet Checksum for the specified data region may be generated by folding any carry bits above the low-order 16 bits and taking the 1's complement of the resulting value.

Syntax static uint32 Internet::psum(u_char* base, int len);

Parameters

| Parameter | Type | Description |
|---|---|---|
| base | unsigned char* | The starting address of the data. |
| len | int | The number of bytes of data. |

Return Value

Returns the 2's-complement 32-bit sum of the data treated as an array of 16-bit words.

incrcksum

Description

Computes a new Internet Checksum incrementally. That is, a new checksum is computed given the original checksum for a region of data, a checksum for a block of data to be replaced, and a checksum of the new data replacing the old data. This function is especially useful when small regions of packets are modified and checksums must be updated appropriately (e.g. for decrementing IP ttl fields or rewriting address fields for NAT).

Syntax static uint16
    Internet::incrcksum(nuint16 ocksum, nuint16 odsum, nuint16 ndsum);

Parameters

| Parameter | Type | Description |
|---|---|---|
| ocksum | nuint16 | The original checksum. |
| odsum | nuint16 | The checksum of the old data. |
| ndsum | nuint16 | The checksum of the new (replacing) data. |

Return Value

Returns the computed checksum.

asum

Description

The function asum computes the checksum over only the IP source and destination addresses.

Syntax static uint16 asum(IP4Header* hdr);

Parameters

| Parameter | Type | Description |
|---|---|---|
| hdr | IP4Header* | Pointer to the header. |

Return Value

Returns the checksum.

apsum

Description

The function apsum behaves like asum but includes the address plus the two 16-bit words immediately following the IP header (which are the port numbers for TCP and UDP).

Syntax static uint16 apsum(IP4Header* hdr);

Parameters

| Parameter | Type | Description |
|---|---|---|
| hdr | IP4Header* | Pointer to the header. |

Return Value

Returns the checksum.

apssum

Description

The function apssum behaves like apsum, but covers the IP addresses, ports, plus TCP sequence number.

Syntax static uint16 apssum(IP4Header* hdr);

Parameters

| Parameter | Type | Description |
|---|---|---|
| hdr | IP4Header* | Pointer to the header. |

Return Value

Returns the checksum.

apasum

Description

The function apasum is behaves like apssum, but covers the TCP ACK field instead of the sequence number field.

Syntax static uint16 apasum(IP4Header* hdr);

Parameters

| Parameter | Type | Description |
|---|---|---|
| hdr | IP4Header* | Pointer to the header. |

Return Value

Returns the checksum.

apsasum

Description

The function apsasum behaves like apasum but covers the IP addresses, ports, plus the TCP ACK and sequence numbers.

Syntax static uint16 apsasum(IP4Header* hdr);

Parameters

| Parameter | Type | Description |
| --- | --- | --- |
| hdr | IP4Header* | Pointer to the header. |

Return Value
  Returns the checksum.

4. IP Support

This section describes the class definitions and constants used in processing IP-layer data. Generally, all data is stored in network byte order (big endian). Thus, care should be taken by the caller to ensure computations result in proper values when processing network byte ordered data on little endian machines (e.g. in the NetBoost software-only environment on pc-compatible architectures).

5. IP Addresses

The IP4Addr class defines 32-bit IP version 4 addresses.

Constructors

Description

The class IP4Addr is the abstraction of an IP (version 4) address within the ASL. It has two constructors, allowing for the creation of the IPv4 addresses given an unsigned 32-bit word in either host or network byte order. In addition, the class is derived from nuint32, so IP addresses may generally be treated as 32-bit integers in network byte order.

Syntax

IP4Addr(nuint32 an);

IP4Addr(uint32 ah);

Parameters

| Parameter | Type | Description |
| --- | --- | --- |
| an | nuint32 | Unsigned 32-bit word in network byte order. |
| ah | uint32 | Unsigned 32-bit word in host byte order. |

Return Value
  None.

Example

The following simple example illustrates the creation of addresses:

include "NBip.h"

uint32 myhaddr = (128 << 24)|(32 << 16)|(12 << 8)|4;

nuint32 mynaddr = htonl((128 << 24)|(32 << 16)|(12 << 8)|4);

IP4Addr ip1(myhaddr);

IP4Addr ip2(mynaddr);

This example creates two IP4Addr objects, each of which refer to the IP address 128.32.12.4. Note the use of the htonl( ) ASL function to convert the host 32-bit word into network byte order.

6. IP Masks

Masks are often applied to IP addresses in order to determine network or subnet numbers, CIDR blocks, etc. The class IP4Mask is the ASL abstraction for a 32-bit mask, available to be applied to an IPv4 address (or for any other use).

Constructor

Description
  Instantiates the IP4Mask object with the mask specified.

Syntax
  IP4Mask(nuint32 nm);

IP4Mask(uint32 mh);

Parameters

| Parameter | Type | Description |
| --- | --- | --- |
| mh | uint32 | 32-bit mask in host byte order |
| mn | nuint32 | 32-bit mask in network byte order |

Return Value

None.

leftcontig

Description
  Returns true if all of the 1-bits in the mask are left-contiguous, and returns false otherwise.

Syntax bool leftcontig( );

Parameters
  None.

Return Value
  Returns true if all the 1-bits in the mask are left-contiguous.

bits

Description
  The function bits returns the number of left-contiguous 1-bits in the mask (a form of "population count").

Syntax int bits( );

Parameters
  None.

Return Value
  Returns the number of left-contiguous bits in the mask. Returns −1 if the 1-bits in the mask are not left-contiguous.

Example

```
#inlude NBip.h
uint32 mymask = 0xffffff80; // 255.255.255.128 or /25
IP4Mask ipm(mymask);
int nbits = ipm.bits( );
if (nbits >= 0) {
    sprintf(msgbuf, "Mask is of the form /%d", nbits);
} else {
    sprintf(msgbuf, "Mask is not left-contiguous!");
}
```

This example creates a subnet mask with 25 bits, and sets up a message buffer containing a string which describes the form of the mask (using the common "slash notation" for subnet masks).

7. IP Header

The IP4Header class defines the standard IP header, where sub-byte sized fields have been merged in order to reduce byte-order dependencies. In addition to the standard IP header, the class includes a number of methods for convenience. The class contains no virtual functions, and therefore pointers to the IP4Header class may be used to point to IP headers received in live network packets.

The class contains a number of member functions, some of which provide direct access to the header fields and others which provide computed values based on header fields. Members which return computed values are described individually; those functions which provide only simple access to fields are as follows:

| Function | Return Type | Description |
| --- | --- | --- |
| vhl( ) | nuint8& | Returns a reference to the byte containing the IP version and header length |
| tos( ) | nuint8& | Returns a reference to the IP type of service byte |
| len( ) | nuint16& | Returns a reference to the IP datagram (fragment) length in bytes |
| id( ) | nuint16& | Returns a reference to the IP identification field (used for fragmentation) |
| offset( ) | nuint16& | Returns a reference to the word containing fragmentation flags and fragment offset |
| ttl( ) | nuint8& | Returns a reference to the IP time-to-live byte |
| proto( ) | nuint8& | Returns a reference to the IP protocol byte |
| cksum( ) | nuint16& | Returns a reference to the IP checksum |
| src( ) | IP4Addr& | Returns a reference to the IP source address |
| dst( ) | IP4Addr& | Returns a reference to the IP destination address |

The following member functions of the IP4Header class provide convenient methods for accessing various information about an IP header.

optbase

Description

Returns the location of the first IP option in the IP header (if present).

Syntax unsigned char* optbase( );

Parameters

None.

Return Value

Returns the address of the first option present in the header. If no options are present, it returns the address of the first byte of the payload.

hl

Description

The first form of this function returns the number of 32-bit words in the IP header. The second form modifies the header length field to be equal to the specified length.

Syntax int hl( )

void hl(int h);

Parameters

| Parameter | Type | Description |
| --- | --- | --- |
| h | int | Specifies the header length (in 32-bit words) to assign to the IP header |

Return Value

The first form of this function returns the number of 32-bit words in the IP header.

hlen

Description

The function hlen returns the number of bytes in the IP header (including options).

Syntax int hlen( );

Parameters
None.

Return Value

Returns the number of bytes in the IP header including options.

ver

Description

The first form of this function ver returns the version field of the IP header (should be 4).

The second form assigns the version number to the IP header.

Syntax int ver( );

void ver(int v);

Parameters

| Parameter | Type | Description |
| --- | --- | --- |
| v | int | Specifies the version number. |

Return Value

The first form returns the version field of the IP header.

payload

Description

The function payload returns the address of the first byte of data (beyond any options present).

Syntax unsigned char* payload( );

Parameters
None.

Return Value

Returns the address of the first byte of payload data in the IP packet.

psum

Description

The function psum is used internally by the ASL library, but may be useful to some applications. It returns the 16-bit one's complement sum of the source and destination IP addresses plus 8-bit protocol field [in the low-order byte]. It is useful in computing pseudo-header checksums for UDP and TCP.

Syntax uint32 psum( );

Parameters
   None.

Return Value
   Returns the 16-bit one's complement sum of the source and destination IP addresses plus the 8-bit protocol field.

Definitions
   In addition to the IP header itself, a number of definitions are provided for manipulating fields of the IP header with specific semantic meanings.

Fragmentation

| Define | Value | Description |
| --- | --- | --- |
| IP_DF | 0x4000 | Don't fragment flag, RFC 791, p. 13. |
| IP_MF | 0x2000 | More fragments flag, RFC 791, p. 13. |
| IP_OFFMASK | 0x1FFF | Mask for determining the fragment offset from the IP header offset( ) function. |

Limitations

| | | |
| --- | --- | --- |
| IP_MAXPACKET | 65535 | Maximum IP datagram size. |

IP Service Type
   The following table contains the definitions for IP type of service byte (not commonly used):

| Define | Value | Reference |
| --- | --- | --- |
| IPTOS_LOWDELAY | 0x10 | RFC 791, p. 12. |
| IPTOS_THROUGHPUT | 0x08 | RFC 791, p. 12. |
| IPTOS_RELIABILITY | 0x04 | RFC 791, p. 12. |
| IPTOS_MINCOST | 0x02 | RFC 1349. |

IP Precedence
   The following table contains the definitions for IP precedence. All are from RFC 791, p. 12 (not widely used).

| Define | Value |
| --- | --- |
| IPTOS_PREC_NETCONTROL | 0xE0 |
| IPTOS_PREC_INTERNETCONTROL | 0xC0 |
| IPTOS_PREC_CRITIC_ECP | 0xA0 |
| IPTOS_PREC_FLASHOVERRIDE | 0x80 |
| IPTOS_PREC_FLASH | 0x60 |
| IPTOS_PREC_IMMEDIATE | 0x40 |
| IPTOS_PREC_PRIORITY | 0x20 |
| IPTOS_PREC_ROUTINE | 0x00 |

Option Definitions
   The following table contains the definitions for supporting IP options. All definitions are from RFC 791, pp. 15–23.

| Define | Value | Description |
| --- | --- | --- |
| IPOPT_COPIED(o) | ((o)&0x80) | A macro which returns true if the option 'o' is to be copied upon fragmentation. |
| IPOPT_CLASS(o) | ((o)&0x60) | A macro giving the option class for the option 'o' |
| IPOPT_NUMBER(o) | ((o)&0x1F) | A macro giving the option number for the option 'o' |
| IPOPT_CONTROL | 0x00 | Control class |
| IPOPT_RESERVED1 | 0x20 | Reserved |
| IPOPT_DEBMEAS | 0x40 | Debugging and/or measurement class |
| IPOPT_RESERVED2 | 0x60 | Reserved |
| IPOPT_EOL | 0 | End of option list. |
| IPOPT_NOP | 1 | No operation. |
| IPOPT_RR | 7 | Record packet route. |
| IPOPT_TS | 68 | Time stamp. |
| IPOPT_SECURITY | 130 | Provide s, c, h, tcc. |
| IPOPT_LSRR | 131 | Loose source route. |
| IPOPT_SATID | 136 | Satnet ID. |
| IPOPT_SSRR | 137 | Strict source route. |
| IPOPT_RA | 148 | Router alert. |

Options Field Offsets
   The following table contains the offsets to fields in options other than EOL and NOP.

| Define | Value | Description |
| --- | --- | --- |
| IPOPT_OPTVAL | 0 | Option ID. |
| IPOPT_OLEN | 1 | Option length. |
| IPOPT_OFFSET | 2 | Offset within option. |
| IPOPT_MINOFF | 4 | Minimum value of offset. |

7. Fragments and Datagrams
   The IP protocol performs adaptation of its datagram size by an operation known as fragmentation. Fragmentation allows for an initial (large) IP datagram to be broken into a sequence of IP fragments, each of which is treated as an independent packet until they are received and reassembled at the original datagram's ultimate destination. Conventional IP routers never reassemble fragments but instead route them independently, leaving the destination host to reassemble them. In some circumstances, however, applications running on the NetBoost platform may wish to reassemble fragments themselves (e.g. to simulate the operation of the destination host).

8. IP Fragment class
   Within the ASL, a fragment represents a single IP packet (containing an IP header), which may or not be a complete IP layer datagram. In addition, a datagram within the ASL represents a collection of fragments. A datagram (or fragment) is said to be complete if it represents or contains all the fragments necessary to represent an entire IP-layer datagram.
   The IP4 Fragment class is defined as follows.

Constructors

Description
   The IP4Fragment class provides the abstraction of a single IP packet placed in an ASL buffer (see the description of the Buffer elsewhere in this chapter). It has two constructors intended for use by applications.
   The first of these allows for specifying the buffer containing an IP fragment as the parameter bp. The location of the of the IP header within the buffer is the second argument. This is the most commonly-used constructor when processing IP fragments in ACE action code.

The second form of the constructor performs the same steps as the first form, but also allocates a new Buffer object and copies the IP header pointed to by iph into the new buffer (if specified). This form of the constructor is primarily intended for creation of IP fragments during IP datagram fragmentation. If the specified header contains IP options, only those options which are copied during fragmentation are copied.

Syntax

IP4Fragment(Buffer* bp, IP4Header* iph);

IP4Fragment(int maxiplen, IP4Header* protohdr = 0);

Parameters

| Parameter | Type | Description |
|---|---|---|
| bp | Buffer* | The starting address of the buffer containing the IP fragment |
| maxiplen | int | The maximum size of the fragment being created; used to size the allocated Buffer. |
| protohdr | IP4Header* | The IP4 header to copy into the buffer, if provided. If the header contains IP options, only those options normally copied during fragmentation are copied. |

Return Value
  None.

Destructor

Description
  Frees the fragment.

Syntax

~IP4Fragment( );

Parameters

None.

Return Value

None.

hdr

Description
  The function hdr returns the address of the IP header of the fragment.

Syntax

Ip4Header* hdr( );

Parameters
  None.

Return Value
  Returns the address of the IP4Header class at the beginning of the fragment.

payload

Description
  The function payload returns the address of the first byte of data in the IP fragment (after the basic header and options).

Syntax u_char* payload( );

Parameters
  None.

Return Value
  Returns the address of the first byte of data in the IP fragment.

buf

Description
  The function buf returns the address of the Buffer structure containing the IP fragment.

Syntax

Buffer* buf( );

Parameters
  None.

Return Value
  Returns the address of the Buffer structure containing the IP fragment. This may return NULL if there is no buffer associated with the fragment.

next

Description
  Returns a reference to the pointer pointing to the next fragment of a doubly-linked list of fragments. This is used to link together fragments when they are reassembled (in Datagrams), or queued, etc. Typically, fragments are linked together in a doubly-linked list fashion with NULL pointers indicating the list endpoints.

Syntax

IP4Fragment*& next( );

Parameters
  None.

Return Value
  Returns a reference to the internal linked-list pointer.

prev

Description
  Like next, but returns a reference to pointer to the previous fragment on the list.

Syntax

IP4Fragment*& prev( );

Parameters
  None.

Return Value
  Returns a reference to the internal linked-list pointer.

first

Description
  The function first returns true when the fragment represents the first fragment of a datagram.

Syntax bool first( );

Parameters
  None.

Return Value

Returns true when the fragment represents the first fragment of a datagram.

fragment

Description

Fragments an IP datagram comprising a single fragment. The fragment( ) function allocates Buffer structures to hold the newly-formed IP fragments and links them together. It returns the head of the doubly-linked list of fragments. Each fragment in the list will be limited in size to at most the specified MTU size. The original fragment is unaffected.

Syntax

IP4Datagram* fragment(int mtu);

Parameters

| Parameter | Type | Description |
|---|---|---|
| mtu | int | The maximum transmission unit MTU size limiting the maximum fragment size |

Return Value

Returns a pointer to an IP4Datagram object containing a doubly-linked list of IP4Fragment objects. Each fragment object is contained within a Buffer class allocated by the ASL library. The original fragment object (the one fragmented) is not freed by this function. The caller must free the original fragment when it is no longer needed.

complete

Description

The function complete returns true when the fragment represents a complete IP datagram.

Syntax bool complete( );

Parameters
  None.

Return Value

Returns true when the fragment represents a complete IP datagram (that is, when the fragment offset field is zero and there are no additional fragments).

optcopy

Description

The static method opt copy is used to copy options from one header to another during IP fragmentation. The function will only copy those options that are supposed to be copied during fragmentation (i.e. for those options x where the macro IPOPT_COPIED(x) is non zero (true)).

Syntax static int optcopy(IP4Header* src, IP4Header* dst);

Parameters

| Parameter | Type | Description |
|---|---|---|
| src | IP4Header* | Pointer to the source IP header containing options |
| dst | IP4Header* | Pointer to the destination, where the source header should be copied to |

Return Value

Returns the number of bytes of options present in the destination IP header.

9. IP Datagram Class

The class IP4Datagram represents a collection of IP fragments, which may (or may not) represent a complete IP4 datagram. Note that objects of the class IP4Datagram include a doubly-linked list of IP4Fragment objects in sorted order (sorted by IP offset). When IP fragments are inserted into a datagram (in order to perform reassembly), coalescing of data between fragments is not performed automatically. Thus, although the IP4Datagram object may easily determine whether it contains a complete set of fragments, it does not automatically reconstruct a contiguous buffer of the original datagram's contents for the caller.

This class supports the fragmentation, reassembly, and grouping of IP fragments. The IP4Datagram class is defined as follows:

Constructors

Description

The class has two constructors.
  The first form of the constructor is used when creating a fresh datagram (typically for starting the process of reassembly).
  The second form is useful when an existing list of fragments are to be placed into the datagram immediately at its creation.

Syntax

IP4Datagram( );

IP4Datagram(IP4Fragment* frag);

Parameters

| Parameter | Type | Description |
|---|---|---|
| frag | IP4Fragment* | Pointer to a doubly linked list of fragments used to create the datagram object |

Return Value
  None.

Destructor

Description

The destructor calls the destructors for each of the fragments comprising the datagram and frees the datagram object.

len

Description

The len function returns the entire length (in bytes) of the datagram, including all of its comprising fragments. Its value is only meaningful if the datagram is complete.

Syntax int len( );

Parameters
   None.

Return Value
   Returns the length of the entire datagram (in bytes). If the datagram contains multiple fragments, only the size of the first fragment header is included in this value.

fragment

Description
   The fragment function breaks an IP datagram into a series of IP fragments, each of which will fit in the packet size specified by mtu. Its behavior is equivalent to the IP4Fragment::fragment (int mtu) function described previously.

Syntax
   IP4Datagram* fragment(int mtu);

Parameters
   See IP4Fragment::fragment(int mtu) above.

Return Value
   See IP4Fragment::fragment(int mtu) above.

insert

Description
   The function insert inserts a fragment into the datagram. The function attempts to reassemble the overall datagram by checking the IP offset and ID fields.

Syntax int insert(IP4Fragment* frag);

Parameters

| Parameter | Type | Description |
| --- | --- | --- |
| frag | IP4Fragment* | Pointer to the fragment being inserted. |

Return Value
   Because this function can fail/act in a large number of ways, the following definitions are provided to indicate the results of insertions that were attempted by the caller. The return value is a 32-bit word where each bit indicates a different error or unusual condition. The first definition below, IPD_INSERT_ERROR is set whenever any of the other conditions are encountered. This is an extensible list which may evolve to indicate new error conditions in future releases:

| Define | Description |
| --- | --- |
| IPD_INSERT_ERROR | 'Or' of all other error bits. |
| IPD_INSERT_OH | Head overlapped. |
| IPD_INSERT_OT | Tail overlapped. |
| IPD_INSERT_MISMATCH | Payload mismatch. |
| IPD_INSERT_CKFAIL | IP header checksum failed (if enabled) | nfrags

Description
   The function nfrags returns the number of fragments currently present in the datagram.

Syntax int nfrags( );

complete

Description
   The function complete returns true when all fragments comprising the original datagram are present.

Syntax bool complete( );

Parameters
   None.

Return Value
   Returns a boolean value indicating when all fragments comprising the original datagram are present.

head

Description
   The function head returns the address of the first IP fragment in the datagram's linked list of fragments.

Syntax

IP4Fragment* head( );

Parameters
   None.

Return Value
   Returns the address of the first IP fragment in the datagram's linked list of fragments.

10. UDP Support

The UDP protocol provides a best-effort datagram service. Due to its limited complexity, only the simple UDP header definitions are included here. Additional functions operating on several protocols (e.g. UDP and TCP NAT) are defined in subsequent sections.

11. UDP Header

The UDPHeader class defines the standard UDP header. It is defined in NBudp.h. In addition to the standard UDP header, the class includes a single method for convenience in accessing the payload portion of the UDP datagram. The class contains no virtual functions, and therefore pointers to the UDPHeader class may be used to point to UDP headers received in live network packets.

The class contains a number of member functions, most of which provide direct access to the header fields. A special payload function may be used to obtain a pointer immediately beyond the UDP header. The following table lists the functions providing direct access to the header fields:

| Function | Return Type | Description |
| --- | --- | --- |
| sport( ) | nuint16& | Returns a reference to the source UDP port number |
| dport( ) | nuint16& | Returns a reference to the destination UDP port number |
| len( ) | nuint16& | Returns a reference to the UDP length field |
| cksum( ) | nuint16& | Returns a reference to the UDP pseudoheader checksum. UDP checksums are optional; a value of all zero bits indicate no checksum is was computed. |

The following function provides convenient access to the payload portion of the datagram, and maintains consistency with other protocol headers (i.e. IP and TCP).

payload

Description

The function payload returns the address of the first byte of data (beyond the UDP header).

Syntax unsigned char* payload( );

Parameters

None.

Return Value

Returns the address of the first byte of payload data in the UDP packet.

12. TCP Support

The TCP protocol provides a stateful connection-oriented stream service. The ASL provides the TCP-specific definitions, including the TCP header, plus a facility to monitor the content and progress of an active TCP flow as a third party (i.e. without having to be an endpoint). For address and port number translation of TCP, see the section on NAT in subsequent sections of this document.

13. TCP Sequence Numbers

TCP uses sequence numbers to keep track of an active data transfer. Each unit of data transfer is called a segment, and each segment contains a range of sequence numbers. In TCP, sequence numbers are in byte units. If a TCP connection is open and data transfer is progressing from computer A to B, TCP segments will be flowing from A to B and acknowledgements will be flowing from B toward A. The acknowledgements indicate to the sender the amount of data the receiver has received. TCP is a bi-directional protocol, so that data may be flowing simultaneously from A to B and from B to A. In such cases, each segment (in both directions) contains data for one direction of the connection and acknowledgements for the other direction of the connection. Both sequence numbers (sending direction) and acknowledgement numbers (reverse direction) use TCP sequence numbers as the data type in the TCP header. TCP sequence numbers are 32-bit unsigned numbers that are allowed to wrap beyond $2^{32}-1$. Within the ASL, a special class called TCPSeq defines this class and associated operators, so that objects of this type may be treated like ordinary scalar types (e.g. unsigned integers).

14. TCP Header

The TCPHeader class defines the standard TCP header. In addition to the standard TCP header, the class includes a set of methods for convenience in accessing the payload portion of the TCP stream. The class contains no virtual functions, and therefore pointers to the TCPHeader class may be used to point to TCP headers received in live network packets.

The class contains a number of member functions, most of which provide direct access to the header fields. A special payload function may be used to obtain a pointer immediately beyond the TCP header. The following table lists the functions providing direct access to the header fields:

| Function | Return Type | Description |
| --- | --- | --- |
| sport( ) | nuint16& | Returns a reference to the source TCP port number |

| Function | Return Type | Description |
| --- | --- | --- |
| dport( ) | nuint16& | Returns a reference to the destination TCP port number |
| seq( ) | TCPSeq& | Returns a reference to the TCP sequence number |
| ack( ) | TCPSeq& | Returns a reference to the TCP acknowledgement number |
| off( ) | nuint8 | Returns the number of 32-bit words in the TCP header (includes TCP options) |
| flags( ) | nuint8& | Returns a reference to the byte containing the 6 flags bits (and 2 reserved bits) |
| win( ) | nuint16& | Returns a reference to the window advertisement field (unscaled) |
| cksum( ) | nuint16& | Returns a reference to the TCP pseudoheader checksum. TCP checksums are not optional. |
| udp( ) | nuint16& | Returns a reference to the TCP urgent pointer field |

The following functions provides convenient access to other characteristics of the segment: payload Description The function payload returns the address of the first byte of data (beyond the TCP header).

Syntax unsigned char* payload( );

Parameters

None.

Return Value

Returns the address of the first byte of payload data in the TCP packet.

window

Description

The function window returns the window advertisement contained in the segment, taking into account the use of TCP large windows (see RFC 1323).

Syntax uint32 window(int wshift)

Parameters

| Parameter | Type | Description |
| --- | --- | --- |
| wshift | int | The "window shift value" (number of left-shift bit positions to scale window field) |

Return Value

Returns the receiver's advertised window in the segment (in bytes). This function is to be used when RFC1323-style window scaling is in use.

optbase

Description

The function optbase returns the address of the first option in the TCP header, if any are present. If no options are present, it returns the address of the first payload byte (which may be urgent data if the URG bit is set in the flags field).

Syntax u_char* optbase( )

Parameters

None.

Return Value

Returns the address of the first byte of data beyond the urgent pointer field of the TCP header.

hlen

Description

The first form of this function ver returns the TCP header length in bytes. The second form assigns the TCP header length to the number of bytes specified.

Syntax int hlen( );

void hlen(int bytes);

Parameters

| Parameter | Type | Description |
|---|---|---|
| bytes | int | Specifies the number of bytes present in the TCP header |

Return Value

The first form returns the number of bytes in the TCP header.

Definitions

In addition to the TCP header itself, a number of definitions are provided for manipulating options in TCP headers:

TCP Options

| Define | Value | Description |
|---|---|---|
| TCPOPT_EOL | 0 | End of Option List |
| TCPOPT_NOP | 1 | No operation (used for padding |
| TCPOPT_MAXSEG | 2 | Maximum segment size |
| TCPOPT_SACK_PERMITTED | 4 | Selective Acknowledgements available |
| TCPOPT_SACK | 5 | Selective Acknowledgements in this segment |
| TCPOPT_TIMESTAMP | 8 | Time stamps |
| TCPOPT_CC | 11 | for T/TCP (see RFC 1644) |
| TCPOPT_CCNEW | 12 | for T/TCP |
| TCPOPT_CCECHO | 13 | for T/TCP |

15. TCP Following

TCP operates as an 11-state finite state machine. Most of the states are related to connection establishment and teardown. By following certain control bits in the TCP headers of segments passed along a connection, it is possible to infer the TCP state at each endpoint, and to monitor the data exchanged between the two endpoints.

Defines

The following definitions are for TCP state monitoring, and indicate states in the TCP finite state machine:

| Define | Value | Description |
|---|---|---|
| TCPS_CLOSED | 0 | Closed |
| TCPS_LISTEN | 1 | Listening for connection. |
| TCPS_SYN_SENT | 2 | Active open, have sent SYN. |
| TCPS_SYN_RECEIVED | 3 | Have sent and received SYN. |
| TCPS_ESTABLISHED | 4 | Established. |
| TCPS_CLOSE_WAIT | 5 | Received FIN, waiting for closed. |
| TCPS_FIN_WAIT_1 | 6 | Have closed; sent FIN. |
| TCPS_CLOSING | 7 | Closed exchanged FIN; awaiting FIN ACK. |
| TCPS_LAST_ACK | 8 | Had FIN and close; await FIN ACK. |
| TCPS_FIN_WAIT_2 | 9 | Have closed, FIN is acked. |
| TCPS_TIME_WAIT | 10 | In 2*MSL quiet wait after close. |
| TCPS_HAVERCVDSYN(s) | ((s) >= TCPS_SYN_RECEIVED) | True if state s indicates a SYN has been received |
| TCPS_HAVEESTABLISHED(s) | ((s) >= TCPS_ESTABLISHED) | True if state s indicates have established ever |
| TCPS_HAVERCVDFIN(s) | ((s) >= TCPS_TIME_WAIT) | True if state s indicates a FIN ever received |

Note 1:
States less than TCPS_ESTABLISHED indicate connections not yet established.
Note 2:
States greater than TCPS_CLOSE_WAIT are those where the user has closed.
Note 3:
States greater than TCPS_CLOSE_WAIT and less than TCPS_FIN_WAIT_2 await ACK of FIN.

The TCPSegInfo Class

The TCPSegInfo class is a container class for TCP segments that have been queued during TCP stream reconstruction and may be read by applications (using the ReassemblyQueue::read function, defined below). When segments are queued, they are maintained in a doubly-linked list sorted by sequence number order. Note that the list may contain "holes". That is, it may contain segments that are not adjacent in the space of sequence numbers because some data is missing in between. In addition, because retransmitted TCP segments can potentially overlap one another's data areas, the starting and ending sequence number fields (startseq_ and endseq_) may not correspond to the starting sequence number The class contains the following fields, all of which are declared public:

| Field | Type | Description |
| --- | --- | --- |
| prev_ | TCPSegInfo* | Pointer to the next TCPSegInfo object of the forward linked list; NULL if no more |
| next_ | TCPSegInfo* | Pointer to the previous TCPSegInfo object of the reverse linked list; NULL if no previous segment exists |
| segment_ | IP4Datagram* | Pointer to the datagram containing the TCP segment |
| startseq_ | TCPSeq | The starting sequence number for the segment |
| endseq_ | TCPSeq | The ending sequence number for the segment |
| startbuf_ | u_char* | Pointer to the byte whose sequence number is specified by the startseq_field |
| endbuf_ | u_char* | Pointer to the byte whose sequence number is specified by the endseq_field |
| flags_ | uint32 | Flags field for the segment (reserved as of the EA2 release) |

The ReassemblyQueue Class

The ReassemblyQueue class is a container class used in reconstructing TCP streams from TCP segments that have been "snooped" on a TCP connection. This class contains a list of TCPSegInfo objects, each of which corresponds to a single TCP segment. The purpose of this class is not only to contain the segments, but to reassemble received segments as they arrive and present them in proper sequence number order for applications to read. Applications are generally able to read data on the connection in order, or to skip past some fixed amount of enqued data.

Constructor

Description

A ReassemblyQueue object is used internally by the TCP stream reconstruction facility, but may be useful to applications in generaly under some circumstances. It provides for reassembly of TCP streams based on sequence numbers contained in TCP segments. The constructor takes an argument specifying the next sequence number to expect. It is updated as additional segments are inserted into the object. If a segment is inserted which is not contiguous in sequence number space, it is considered "out of order" and is queued in the object until the "hole" (data between it and the previous in-sequence data) is filled.

Syntax

ReassemblyQueue(TCPSeq& rcvnxt)

Parameters

| Parameter | Type | Description |
| --- | --- | --- |
| rcvnxt | TCPSeq& | A reference to the next TCP sequence number to expect. The sequence number referred to by rcvnxt is updated by the add function (see below) to always indicate the next in-order TCP sequence number expected |

Return Value
None.

Defines

The following definitions are provided for insertion of TCP segments into a ReassemblyQueue object, and are used as return values for the add function defined below. Generally, acceptable conditions are indicated by bits in the low-order half-word, and suspicious or error conditions are indicated in the upper half-word.

| Define | Value | Description |
| --- | --- | --- |
| RQ_OK | 0x00000000 | Segment was non-overlapping and in-order |
| RQ_OUTORDER | 0x00000001 | Segment was out of order (didn't match next expected sequence number) |
| RQ_LOW_OLAP | 0x00000002 | Segment's sequence number was below next expected but segment extended past next expected |
| RQ_HIGH_OLAP | 0x00000004 | Segment's data overlapped another queued segment's data |
| RQ_DUP | 0x00000008 | Completely duplicate segment |
| RQ_BAD_HLEN | 0x00010000 | Bad header length (e.g. less than 5) |
| RQ_BAD_RSVD | 0x00020000 | Bad reserved field (reserved bits are non-zero) |
| RQ_FLAGS_ALERT | 0x00040000 | Suspicious combination of flags (e.g. RST on or all on, etc) |
| RQ_FLAGS_BADURP | 0x00080000 | Bad urgent pointer | add

Description

The add function inserts an IP datagram or complete IP fragment containing a TCP segment into the reassembly queue. The TCP sequence number referenced by rcvnxt in the constructor is updated to reflect the next in-sequence sequence number expected.

Syntax int add(IP4Datagram* dp, TCPSeq seq, uint32 dlen);

int add(IP4Fragment* fp, TCPSeq seq, uint32 dlen);

Parameters

| Parameter | Type | Description |
| --- | --- | --- |
| fp | IP4Fragment* | Pointer to an unfragmented IP fragment containing a TCP segment |
| dp | IP4Datagram* | A pointer to a complete IP datagram containing a TCP segment |
| seq | TCPSeq | Initial sequence number for the TCP segment |
| dlen | uint32 | Usable length of the TCP segment |

Return Value

Returns a 32-bit integer with the possible values indicated above (definitions beginning with RQ_).

empty

Description

The empty function returns true if the reassembly queue contains no segments.

Syntax bool empty( )

Parameters
    None.

Return Value

Returns true if the reassembly queue contains no segments.

clear

Description

The clear function removes all queued segments from the reassembly queue and frees their storage.

Syntax void clear( )

Parameters
    None.

Return Value
    None.

read

Description

The read function provides application access to the contiguous data currently queued in the reassembly queue. The function returns a linked list of TCPSegInfo objects. The list is in order sorted by sequence number beginning with the first in-order sequence number and continues no further than the number of bytes specified by the caller. Note that the caller must inspect the value filled in by the call to determine how many byte worth of sequence number space is consumed by the linked list. This call removes the segments returned to the caller from the reassembly queue.

Syntax

TCPSegInfo* read(int& len);

Parameters

| Parameter | Type | Description |
| --- | --- | --- |
| len | int& | Contains the number of bytes worth of in-sequence data the application is interested in reading from the reassembly queue. The underlying integer is modified by this call to indicate the number of bytes actually covered by the list of segments returned. The call is guaranteed to never return a larger number of bytes than requested. |

Return Value

Returns a pointer to the first TCPSegInfo object in a doubly-linked list of objects each of which point to TCP segments that are numerically adjacent in TCP sequence number space.

The TCPEndpoint Class

The TCPEndpoint class is the abstraction of a single endpoint of a TCP connection. In TCP, a connection is identified by a 4-tuple of two IP addresses and a two port numbers. Each endpoint is identified by a single IP address and port number. Thus, a TCP connection (or "session"—see below) actually comprises two endpoint objects. Each endpoint contains the TCP finite state machine state as well as a ReassemblyQueue object, used to contain queued data. The TCPEndpoint class is used internally by the TCPSession class below, but may be useful to applications in certain circumstances.

Constructor

Description

The TCPEndpoint class is created in an empty state and is unable to determine which endpoint of a connection it represents. The user should call the init function described below after object instantiation to begin use of the object.

Syntax

TCPEndpoint( )

Parameters
    None.

Return Value
    None.

Destructor

Description

Deletes all queued TCP segments and frees the object's memory.

Syntax

~TCPEndpoint( )

Parameters
    None.

Return Value
    None.

reset

Description

Resets the endpoint internal state to closed and clears any queued data.

Syntax

~TCPEndpoint( )

Parameters
  None.

Return Value
  None.

state

Description

Returns the current state in the TCP finite state machine associated with the TCP endpoint.

Syntax int state( )

Parameters
  None.

Return Value

Returns an integer indicating the internal state according to the definitions given above (defines beginning with TCPS_)

init

Description

The init function provides initialization of a TCP endpoint object by specifying the IP address and port number the endpoint is acting as. After this call has been made, subsequent processing of IP datagrams and fragments containing TCP segments (and ACKs) is accomplished by the process calls described below.

Syntax void init(IP4Addr* myaddr, uint16 myport);

Parameters

| Parameter | Type | Description |
| --- | --- | --- |
| myaddr | IP4Addr* | A pointer to the IP address identifying this TCP endpoint |
| myport | nuint16 | The port number (in network byte order) of port number identifying this TCP endpoint |

Return Value
  None.

process

Description

The process function processes an incoming or outgoing TCP segment relative to the TCP endpoint object. The first form of the function operates on a datagram which must be complete; the second form operates on a fragment which must also be complete. Given that the TCPEndpoint object is not actually the literal endpoint of the TCP connection itself, it must infer state transitions at the literal endpoints based upon observed traffic. Thus, it must monitor both directions of the TCP connection to properly follow the state at each literal endpoint.

Syntax int process(IP4Datagram* pd);

int process(IP4Fragment* pf);

Parameters

| Parameter | Type | Description |
| --- | --- | --- |
| pd | IP4Datagram* | A pointer to a complete IP datagram containing a TCP segment |
| pf | IP4Fragment* | Pointer to an unfragmented IP fragment containing a TCP segment |

Return Value

Returns a 32-bit integer with the same semantics defined for

ReassemblyQueue::add (see above).

The TCPSession Class

The TCPSession class is the abstraction of a complete, bi-directional TCP connection. It includes two TCP endpoint objects, which each include a reassembly queue. Thus, provided the TCPSession object is able to process all data sent on the connection in either direction it will have a reasonably complete picture of the progress and data exchanged across the connection.

Constructor

Description

The TCPSession object is created by the caller when a TCP segment arrives on a new connection. The session object will infer from the contents of the segment which endpoint will be considered the client (the active opener—generally the sender of the first SYN), and which will be considered the server (the passive opener—generally the sender of the first SYN+ACK). In circumstances of simultaneous active opens (a rare case when both endpoints send SYN packets), the notion of client and server is not well defined, but the session object will behave as though the sender of the first SYN received by the session object is the client. In any case, the terms client and server are only loosely defined and do not affect the proper operation of the object.

Syntax

TCPSession(IP4Datagram* dp);

TCPSession(IP4Fragment* fp);

Parameters

| Parameter | Type | Description |
| --- | --- | --- |
| pd | IP4Datagram* | A pointer to a complete IP datagram containing the first TCP segment on the connection |
| pf | IP4Fragment* | Pointer to a complete IP fragment containing a the first TCP segment on the connection |

Return Value
  None.

Destructor

Description

Deletes all TCP segments queued and frees the object's memory.

Syntax

~TCPSession( )

Parameters

None.

Return Value

None.

process

Description

The process function processes a TCP segment on the connection. The first form of the function operates on a datagram which must be complete; the second form operates on a fragment which must also be complete. This function operates by passing the datagram or fragment to each endpoint's process function.

Syntax int process(IP4Datagram* pd);

int process(IP4Fragment* pf);

Parameters

| Parameter | Type | Description |
| --- | --- | --- |
| pd | IP4Datagram* | A pointer to a complete IP datagram containing a TCP segment |
| pf | IP4Fragment* | Pointer to an unfragmented IP fragment containing a TCP segment |

Return Value

Returns a 32-bit integer with the same semantics defined for ReassemblyQueue::add (see above). The value returned will be the result of calling the add function of the reassembly queue object embedded in the endpoint object corresponding to the destination address and port of the received segment.

16. Network Address Translation (NAT)

Network Address Translation (NAT) refers to the general ability to modify various fields of different protocols so that the effective source, destination, or source and destination entities are replaced by an alternative. The definitions to perform NAT for the IP, UDP, and TCP protocols are defined within the ASL. The NAT implementation uses incremental checksum computation, so performance should not degrade in proportion to packet size.

17. IP NAT

IP address translation refers to the mapping of an IP datagram (fragment) with source and destination IP address (s1,d1) to the same datagram (fragment) with new address pair (s2, d2). A source-rewrite only modifies the source address (d1 is left equal to d2). A destination rewrite implies only the destination address is rewritten (s1 is left equal to s2). A source and destination rewrite refers to a change in both the source and destination IP addresses. Note that for IP NAT, only the IP source and/or destination addresses are rewritten (in addition to rewriting the IP header checksum). For traffic such as TCP or UDP, NAT functionality must include modification of the TCP or UDP pseudoheader checksum (which covers the IP header source and destination addresses plus protocol field). Properly performing NAT on TCP or UDP traffic, requires attention to these details.

18. IP NAT Base Class

The class IPNat provides a base class for other IP NAT classes. Because of the pure virtual function rewrite, applications will not create objects of type IP4Nat directly, but rather use the objects of typeIP4SNat, IP4DNat, and IP4SDNat defined below.

rewrite

Description

This pure-virtual function is defined in derived classes. It performs address rewriting in a specific fashion implemented by the specific derived classes (i.e. source, destination, or source/destination combination). The rewrite call, as applied to a fragment, only affects the given fragment. When applied to a datagram, each of the fragment headers comprising the datagram are re-written.

Syntax virtual void rewrite(IP4Datagram*fp) = 0;

virtual void rewrite(IP4Fragment*fp) = 0;

Parameters

| Parameter | Type | Description |
| --- | --- | --- |
| dp | IP4Datagram* | Pointer to the datagram to rewrite |
| fp | IP4Fragment* | Pointer to the single fragment to rewrite |

Return Value

None.

There are three classes available for implementing IP NAT, all of which are derived from the base class IP4Nat. The classes IP4SNat, IPDNat, and IPSDNat define the structure of objects implementing source, destination, and source/destination rewriting for IP datagrams and fragments.

19. IP4SNat class

The IP4 SNat class is derived from the IP4Nat class. It defines the class of objects implementing source rewriting for IP datagrams and fragments.

Constructor

Description

Instantiates the IP4 SNat object.

Syntax

IP4SNat(IP4Addr* newsrc);

Parameters

| Parameter | Type | Description |
| --- | --- | --- |
| newsrc | IP4Addr* | Pointer to the new source address for IP NAT. |

Return Value

None.

rewrite

Description

Defines the pure virtual rewrite functions in the parent class.

Syntax void rewrite(IP4Datagram* dp);

void rewrite(IP4Fragment* fp);

Parameters

| Parameter | Type | Description |
|---|---|---|
| dp | IP4Datagram* | Pointer to the datagram to be rewritten (all fragment headers are modified) |
| fp | IP4Fragment* | Pointer to the fragment to rewrite (only the single fragment header is modified) |

Return Value

None.

20. IP4DNat Class

The IP4 DNat class is derived from the IP4Nat class. It defines the class of objects implementing destination rewriting for IP datagrams and fragments.

Constructor

Description

Instantiates the IP4 DNat object.

Syntax

IP4DNat(IP4Addr* newdst);

Parameters

| Parameter | Type | Description |
|---|---|---|
| newdst | IP4Addr* | Pointer to the new destination address for IP NAT. |

Return Value

None.

rewrite

Description

Defines the pure virtual rewrite functions in the parent class.

Syntax void rewrite(IP4Datagram* dp);

void rewrite(IP4Fragment* fp);

Parameters

| Parameter | Type | Description |
|---|---|---|
| dp | IP4Datagram* | Pointer to the datagram to be rewritten (all fragment headers are modified) |
| fp | IP4Fragment* | Pointer to the fragment to rewrite (only the single fragment header is modified) |

Return Value

None.

21. IP4SDNat Class

The IP4SDNat class is derived from the IP4Nat class. It defines the class of objects implementing source and destination rewriting for IP datagrams and fragments.

Constructor

Description

Instantiates the IP4SDNat object.

Syntax

IP4SDNat(IP4Addr* newsrc, IP4Addr* newdst);

Parameters

| Parameter | Type | Description |
|---|---|---|
| nesrc | IP4Addr* | Pointer to the new source address for IP NAT. |
| newdst | IP4Addr* | Pointer to the new destination address for IP NAT. |

Return Value

None.

rewrite

Description

Defines the pure virtual rewrite functions in the parent class.

Syntax void rewrite(IP4Datagram* dp);

void rewrite(IP4Fragment* fp);

Parameters

| Parameter | Type | Description |
|---|---|---|
| dp | IP4Datagram* | Pointer to the datagram to be rewritten (all fragment headers are modified) |
| fp | IP4Fragment* | Pointer to the fragment to rewrite (only the single fragment header is modified) |

Return Value

None.

Example

For fragments, only the single fragment is modified. For datagrams, all comprising fragments are updated. The following simple example illustrates the use of one of these objects:

Assuming ipa1 is an address we wish to place in the IP packet's destination address field, buf points to the ASL buffer containing an IP packet we wish to rewrite, and iph points the IP header of the packet contained in the buffer:

IPDNat *ipd = new IPDNat(&ipa1); // create IP DNat object

IP4Fragment ipf(buf, iph); // create IP fragment object ipd→rewrite(&ipf); // rewrite fragment's header The use of other IP NAT objects follows a similar pattern.

22. UDP NAT

The organization of the UDP NAT classes follows the IP NAT classes very closely. The primary difference is in the handling of UDP ports. For UDP NAT, the optional rewriting of port numbers (in addition to IP layer addresses) is specified in the constructor.

23. UDPNat Base Class

The class UDPNat provides a base class for other UDP NAT classes. The constructor is given a value indicating whether port number rewriting is enabled. Because of the pure virtual function rewrite, applications will not create objects of type UDPNat directly, but rather use the objects of type UDPSNat, UDPDNat, and UDPSDNat defined below.

Constructor

Description

The constructor is given a value indicating whether port number rewriting is enabled.

Syntax

UDPNat(bool doports);

Parameters

| Parameter | Type | Description |
|---|---|---|
| doports | bool | Boolean value indicating whether the port number rewriting is enabled. A true value indicates port number rewriting is enabled. |

Return Value

None.

rewrite

Description

This pure-virtual function is defined in derived classes. It performs address rewriting in a specific fashion implemented by the specific derived classes (i.e. source, destination, or source/destination combination). The rewrite call, as applied to a fragment, only affects the given fragment. When applied to a datagram, each of the fragment headers comprising the datagram are re-written.

Syntax virtual void rewrite(IP4Datagram*fp) = 0;

virtual void rewrite(IP4Fragment*fp) = 0;

Parameters

| Parameter | Type | Description |
|---|---|---|
| dp | IP4Datagram* | Pointer to the datagram to rewrite |
| fp | IP4Fragment* | Pointer to the single fragment to rewrite |

Return Value
  None.

ports

Description

The first form of this function returns true if the NAT object is configured to rewrite port numbers. The second form of this function configures the object to enable or disable port number rewriting using the values true and false, respectively.

Syntax bool ports( );

void ports(bool p);

Parameters

| Parameter | Type | Description |
|---|---|---|
| p | bool | Boolean containing whether port rewriting is enabled. |

Return Value

The first form of this function returns true if the NAT object is configured to rewrite UDP port numbers.

24. UDPSNat Class

The UDPSNat class is derived from the UDPNat class. It defines the class of objects implementing source address and (optionally) port number rewriting for complete and fragmented UDP datagrams.

Constructors

Description

The single-argument constructor is used to create UDP NAT objects that rewrite only the addresses in the IP header (and update the IP header checksum and UDP pseudo-header checksum appropriately). The two-argument constructor is used to create NAT objects that also rewrite the source port number in the UDP header. For fragmented UDP datagrams, the port numbers will generally be present in only the first fragment.

Syntax

UDPSNat(IP4Addr* newsaddr, nuint16 newsport);

UDPSNat(IP4Addr* newsaddr);

Parameters

| Parameter | Type | Description |
|---|---|---|
| newsaddr | IP4Addr* | Pointer the new source address to be used |
| newsport | nuint16 | The new source port number to be used |

Return Value

None.

rewrite

Description

Defines the pure virtual rewrite functions in the parent class.

Syntax void rewrite(IP4Datagram* dp);

void rewrite(IP4Fragment* fp);

Parameters

| Parameter | Type | Description |
|---|---|---|
| dp | IP4Datagram* | Pointer to the datagram to be rewritten (all fragment headers are modified) |
| fp | IP4Fragment* | Pointer to the fragment to rewrite (only the single fragment header is modified). Should only be called when the fragment represents a complete UDP/IP datagram. |

Return Value

None.

25. UDPDNat Class

The UDPDNat class is derived from the UDPNat class. It defines the class of objects implementing destination address and (optionally) port number rewriting for complete and fragmented UDP datagrams.

Constructors

Description

The single-argument constructor is used to create UDP NAT objects that rewrite only the addresses in the IP header (and update the IP header checksum and UDP pseudo-header checksum appropriately). The two-argument constructor is used to create NAT objects that also rewrite the destination port number in the UDP header. For fragmented UDP datagrams, the port numbers will generally be present in only the first fragment.

Syntax

UDPSNat(IP4Addr* newdaddr, nuint16 newdport);

UDPSNat(IP4Addr* newdaddr);

Parameters

| Parameter | Type | Description |
|---|---|---|
| newdaddr | IP4Addr* | Pointer the new destination address to be used |
| newdport | nuint16 | The new destination port number to be used |

Return Value

None.

rewrite

Description

Defines the pure virtual rewrite functions in the parent class.

Syntax void rewrite(IP4Datagram* dp);

void rewrite(IP4Fragment* fp);

Parameters

| Parameter | Type | Description |
|---|---|---|
| dp | IP4Datagram* | Pointer to the datagram to be rewritten (all fragment headers are modified) |
| fp | IP4Fragment* | Pointer to the fragment to rewrite (only the single fragment header is modified). Should only be called when the fragment represents a complete UDP/IP datagram. |

Return Value

None.

26. UDPSDNat Class

The UDPSDNat class is derived from the UDPNat class. It defines the class of objects implementing source and destination address and (optionally) port number rewriting for complete and fragmented UDP datagrams.

Constructors

Description

The two-argument constructor is used to create UDP NAT objects that rewrite only the addresses in the IP header (and update the IP header checksum and UDP pseudo-header checksum appropriately). The four-argument constructor is used to create NAT objects that also rewrite the source and destination port number in the UDP header. For fragmented UDP datagrams, the port numbers will generally be present in only the first fragment.

Syntax

UDPSNat(IP4Addr* newsaddr, nuint16 newsport, IP4Addr* newdaddr, nuint16 newdport);

UDPSNat(IP4Addr* newsaddr, IP4Addr* newdaddr);

Parameters

| Parameter | Type | Description |
|---|---|---|
| newsaddr | IP4Addr* | Pointer the new source address to be used |
| newsport | nuint16 | The new source port number to be used |
| newdaddr | IP4Addr* | Pointer the new destination address to be used |
| newdport | nuint16 | The new destination port number to be used |

Return Value

None.

rewrite

Description

Defines the pure virtual rewrite functions in the parent class.

Syntax void rewrite(IP4Datagram* dp);

void rewrite(IP4Fragment* fp);

Parameters

| Parameter | Type | Description |
|---|---|---|
| dp | IP4Datagram* | Pointer to the datagram to be rewritten (all fragment headers are modified) |
| fp | IP4Fragment* | Pointer to the fragment to rewrite (only the single fragment header is modified). Should only be called when the fragment represents a complete UDP/IP datagram. |

Return Value

None.

27. TCP NAT

The structure of the TCP NAT support classes follow the UDP classes very closely. The primary difference is in the handling of TCP sequence and ACK numbers.

28. TCPNat Base Class

The class TCPNat provides a base class for other TCP NAT classes. The constructor is given a pair of values indicating whether port number, sequence number, and acknowledgement number rewriting is enabled. Sequence number and ACK number rewriting are coupled such that enabling sequence number rewriting for source-rewriting will modify the sequence number field of the TCP segment, but enabling sequence number rewriting for destination-rewriting will instead modify the ACK field. This arrangement makes it possible to perform NAT on TCP streams without unnecessary complexity in the TCP NAT interface. Because of the pure virtual function rewrite, applications will not create objects of type TCPNat directly, but rather use the objects of type TCPSNat, TCPDNat, and TCPSDNat defined below.

Constructor

Description

The constructor is given a value indicating whether port number rewriting is enabled.

Syntax

TCPNat(bool doports, bool doseqs);

Parameters

| Parameter | Type | Description |
| --- | --- | --- |
| doports | bool | Boolean value indicating whether the port number rewriting is enabled. A true value indicates port number rewriting is enabled. |
| doseqs | bool | Boolean value indicating whether the sequence/ACK number rewriting is enabled. A true value indicates sequence/ACK number rewriting is enabled. |

Return Value

None.

rewrite

Description

This pure-virtual function is defined in derived classes. It performs address rewriting in a specific fashion implemented by the specific derived classes (i.e. source, destination, or source/destination combination). The rewrite call, as applied to a fragment, only affects the given fragment. When applied to a datagram, each of the fragment headers comprising the datagram are re-written.

Syntax virtual void rewrite(IP4Datagram* dp) = 0;

virtual void rewrite(IP4Fragment* fp) = 0;

Parameters

| Parameter | Type | Description |
| --- | --- | --- |
| dp | IP4Datagram* | Pointer to the datagram to rewrite |
| fp | IP4Fragment* | Pointer to the single fragment to rewrite |

Return Value

None.

ports

Description

The first form of this function returns true if the NAT object is configured to rewrite port numbers. The second form of this function configures the object to enable or disable port number rewriting using the values true and false, respectively.

Syntax bool ports( );

void ports(bool p);

Parameters

| Parameter | Type | Description |
| --- | --- | --- |
| p | bool | Boolean indicating whether port number rewriting is enabled. |

Return Value

The first form of this function returns true if the NAT object is configured to rewrite TCP port numbers.

seqs

Description

The first form of this function returns true if the NAT object is configured to rewrite sequence/ACK numbers. The second form of this function configures the object to enable or disable sequence/ACK number rewriting using the values true and false, respectively.

Syntax bool seqs ( );

void seqs (bool s);

Parameters

| Parameter | Type | Description |
| --- | --- | --- |
| s | bool | Boolean indicating whether sequence/ACK number rewriting is enabled. |

Return Value

The first form of this function returns true if the NAT object is configured to rewrite TCP port numbers.

29. TCPSNat Class

The TCPSNat class is derived from the TCPNat class. It defines the class of objects implementing source address and (optionally) port number and sequence number rewriting for complete and fragmented TCP segments.

Constructors

Description

The single-argument constructor is used to create TCP NAT objects that rewrite only the addresses in the IP header (and update the IP header checksum and TCP pseudo-header checksum appropriately). The two-argument constructor is used to create NAT objects that also rewrite the source port number in the TCP header. The three-argument constructor is used to rewrite the IP address, source port number, and to modify the TCP sequence number by a relative (constant) amount. The sequence offset provided may be positive or negative.

Syntax

TCPSNat(IP4Addr* newsaddr);

TCPSNat(IP4Addr* newsaddr, nuint16 newsport);

TCPSNat(IP4Addr* newsaddr, nuint16 newsport, long seqoff)

Parameters

| Parameter | Type | Description |
| --- | --- | --- |
| newsaddr | IP4Addr* | Pointer the new source address to be used |
| newsport | nuint16 | The new source port number to be used |
| seqoff | long | Relative change to make to TCP sequence number fields. A positive value indicates the TCP sequence number is increased by the amount specified. A negative value indicates the sequence number is reduced by the amount specified. |

Return Value

None.

rewrite

Description

Defines the pure virtual rewrite functions in the parent class.

Syntax void rewrite(IP4Datagram* dp);

void rewrite(IP4Fragment* fp);

Parameters

| Parameter | Type | Description |
| --- | --- | --- |
| dp | IP4Datagram* | Pointer to the datagram to be rewritten (all fragment headers are modified) |
| fp | IP4Fragment* | Pointer to the fragment to rewrite (only the single fragment header is modified). Should only be called when the fragment represents a complete TCP/IP segment. |

Return Value

None.

30. TCPSDNat Class

The TCPSDNat class is derived from the TCPNat class. It defines the class of objects implementing source address and (optionally) port number and sequence number/ACK number rewriting for complete and fragmented TCP segments.

Constructors

Description

The two-argument constructor is used to create TCP NAT objects that rewrite only the addresses in the IP header (and update the IP header checksum and TCP pseudo-header checksum appropriately). The four-argument constructor is used to create NAT objects that also rewrite the source and destination port numbers in the TCP header. The three-argument constructor is used to rewrite the IP address, source port number, and to modify the TCP ACK number by a relative (constant) amount. The ACK offset provided may be positive or negative.

Syntax

TCPSDNat(IP4Addr* newsaddr, IP4Addr* newdaddr);

TCPSDNat(IP4Addr* newsaddr, nuint16 newsport, IP4Addr* newdaddr, nuint16 newdport);

TCPSDNat(IP4Addr* newsaddr, nuint16 newsport, long seqoff,

IP4Addr* newdaddr, nuint16 newdport, long ackoff);

Parameters

| Parameter | Type | Description |
| --- | --- | --- |
| newsaddr | IP4Addr* | The new source address to be used |
| newsport | nuint16 | The new source port number to be used |
| seqoff | long | Relative change to make to TCP sequence number fields. A positive value indicates the TCP sequence number is increased by the amount specified. A negative value indicates the sequence number is reduced by the amount specified. |
| newdaddr | IP4Addr* | The new destination address to be used |
| newdport | nuint16 | The new destination port number to be used |
| ackoff | long | Relative change to make to TCP ACK number fields. A positive value indicates the TCP ACK number is increased by the amount specified. A negative value indicates the ACK number is reduced by the amount specified. |

Return Value

None.

rewrite

Description

Defines the pure virtual rewrite functions in the parent class.

Syntax void rewrite(IP4Datagram* dp);

void rewrite(IP4Fragment* fp);

Parameters

| Parameter | Type | Description |
| --- | --- | --- |
| dp | IP4Datagram* | Pointer to the datagram to be rewritten (all fragment headers are modified) |
| fp | IP4Fragment* | Pointer to the fragment to rewrite (only the single fragment header is modified). Should only be called when the fragment represents a complete TCP/IP segment. |

Return Value

None.

NetBoost Platform

FIGS. 1–4 depict a sample platform for use with the compiler described above.

Figure 1:
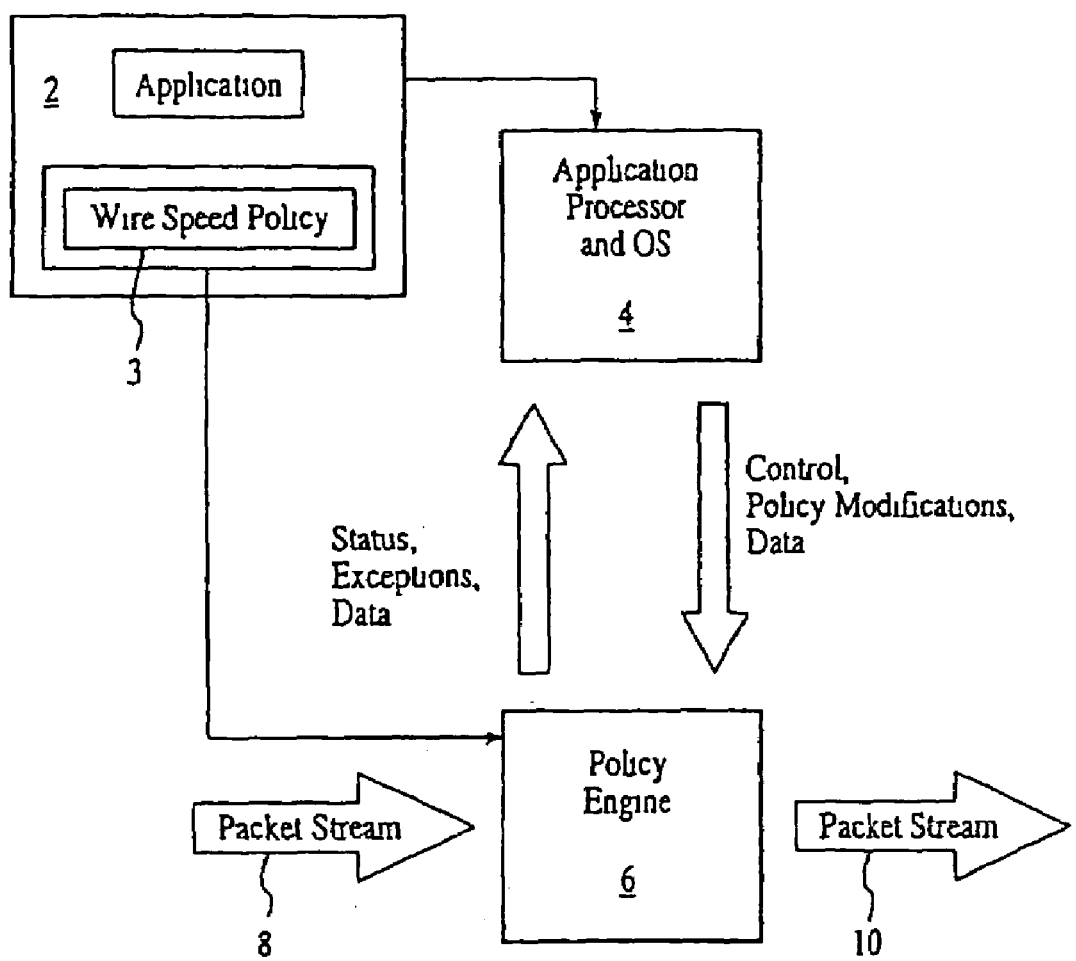
FIG. 1 is a block diagram of a system in accordance with the present invention.

FIG. 1 shows a Network Infrastructure Application, called Application 2, being deployed on an Application Processor (AP) 4 running a standard operating system. The policy enforcement section of the Application 2, called Wire Speed Policy 3 runs on the Policy Engine (PE) 6. The Policy Engine 6 transforms the inbound Packet Stream 8 into the outbound Packet Stream 10 per the Wire Speed Policy 3. Communications from the Application Processor 4 to the Policy Engine 6, in addition to the Wire Speed Policy 3, consists of control, policy modifications and packet data as desired the Application 2. Communication from the Policy Engine 3 to the Application Processor 4 consists of status, exception conditions and packet data as desired by the Application 2.

In a preferred embodiment of a Policy Engine (PE) according to the present invention, the PE provides a highly programmable platform for classifying network packets and implementing policy decisions about those packets at wire speed. Certain embodiments provide two Fast Ethernet ports and implement a pipelined dataflow architecture with store-and-forward. Packets are run through a Classification Engine (CE) which executes a programmed series of hardware assist operations such as chained field comparisons and generation of checksums and hash table pointers, then are handed to a microprocessor ("Policy Processor" or PP) for execution of policy decisions such as Pass, Drop, Enqueue/Delay, (de/en)capsulate, and (de/en)crypt based on the results from the CE. Some packets which require higher level processing may be sent to the host computer system ("Application Processor" or AP). (See FIG. 4.) An optional cryptographic ("Crypto") Processor is provided for accelerating such functions as encryption and key management.

CE programs can be written directly in binary; however for programmer convenience a microassembly language uasm has been developed which allows a microword to be constructed by declaring fields and their values in a symbolic form. The set of common microwords for the intended use of the CE have also been described in a higher-level CE Assembly Language called masm which allows the programmer to describe operations in a register-transfer format and to describe concurrent operations without having to worry about the details of microcode control of the underlying hardware. Both of these languages can be used by a programmer or can be generated automatically from a compiler which translates CE programs from a higher-level language such as NetBoost Classification Language (NCL).

Figure 4:
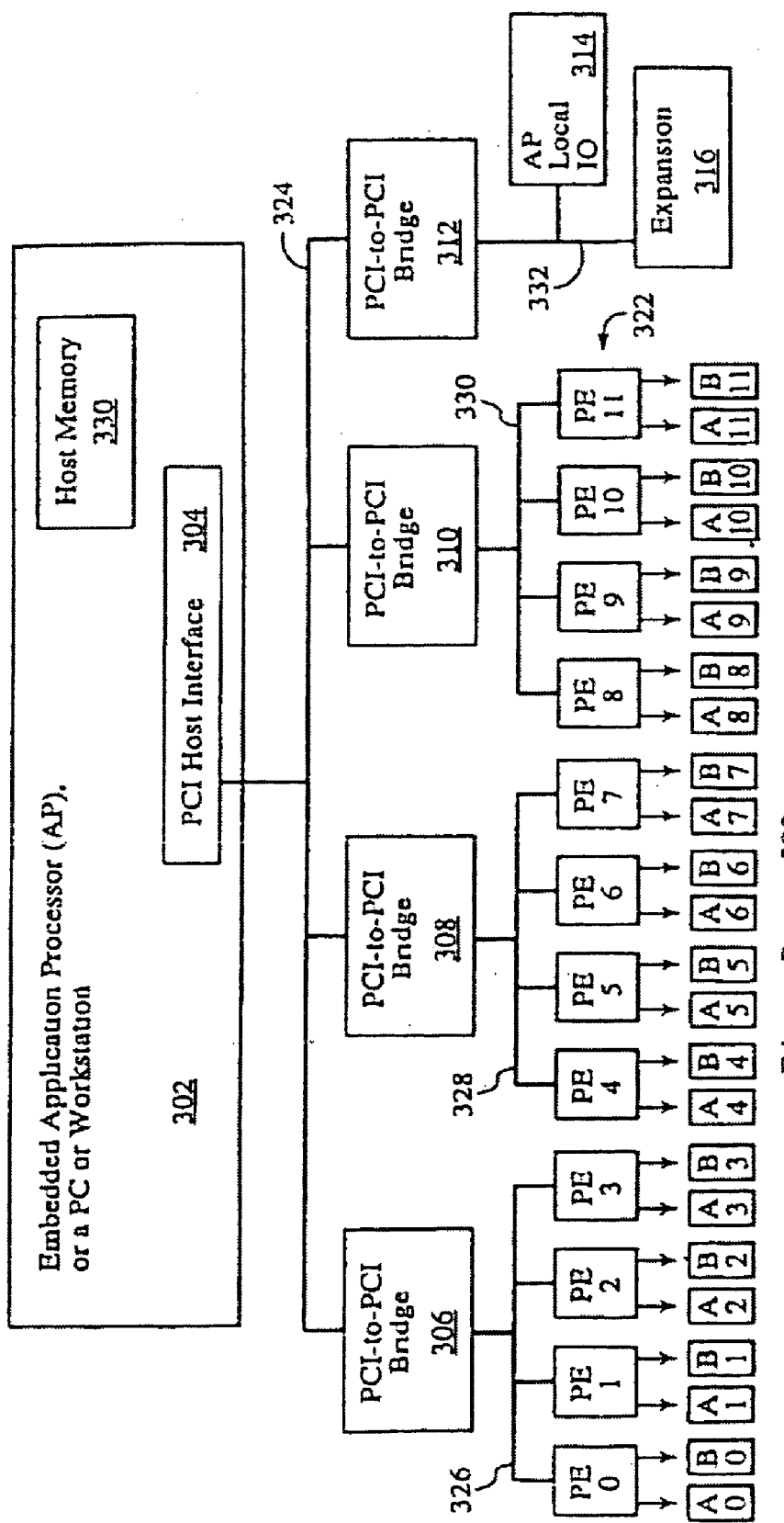
FIG. 4 is a sample system-level block diagram related to the present invention.

A sample system level block diagram is shown in FIG. 4.

FIG. 4 shows an application processor 302 which contains a host interface 304 to a PCI bus 324. Fanout of the PCI bus 324 to a larger number of loads is accomplished with PCI-to-PCI Bridge devices 306, 308, 310, and 312; each of those controls an isolated segment on a "child" PCI bus 326, 328, 330, and 332 respectively. On three of these isolated segments 326, 328, and 330 is a number of Policy Engines 322; each Policy Engine 322 connects to two Ethernet ports 320 which connects the Policy Engine 322 to a network segment.

One of the PCI-to-PCI Bridges 312 controls child PCI bus 322, which provides the Application Processor 302 with connection to standard I/O devices 314 and optionally to PCI expansion slots 316 into which additional PCI devices can be connected.

In a smaller configuration of the preferred embodiment of the invention the number of Policy Engines 322 does not exceed the maximum load allowed on a PCI bus 324; in that case the PCI-to-PCI bridges 306, 308, and 310 are eliminated and up to four Policy Engines 322 are connected directly to the host PCI bus 324, each also connecting to two Ethernet ports 320. This smaller configuration may still have the PCI-to-PCI Bridge 312 present to isolate Local I/O 314 and expansion slots 316 from the PCI bus 324, or the Bridge 312 may also be eliminated and the devices 314 and expansion 316 may also be connected directly to the host PCI bus 324.

In certain embodiments, the PE utilizes two Fast Ethernet MAC's (Media Access Controllers) with IEEE 802.3 standard Media Independent Interface ("MII") connections to external physical media (PHY) devices which attach to Ethernet segments. Each Ethernet MAC receives packets into buffers addressed by buffer pointers obtained from a producer-consumer ring and then passes the buffer (that is, passes the buffer pointer) to a Classification Engine for processing, and from there to the Policy Processor. The "buffer pointer" is a data structure comprising the address of a buffer and a software-assigned "tag" field containing other information about that buffer. The "buffer pointer" is a fundamental unit of communication among the various hardware and software modules comprising a PE. From the PP, there are many paths the packet can take, depending on what the application(s) running on the PP decide is the proper disposition of that packet. It can be transmitted, sent to Crypto, delayed in memory, passed through a Classification Engine again for further processing, or copied from the PE's memory over the PCI bus to the host's memory or to a peer device's memory, using the DMA engine. The PP may also gather statistics on that packet into records in a hash table or in general memory. A pointer to the buffer containing both the packet and data structures describing that packet is passed around among the various modules.

The PP may choose to drop a packet, to modify the contents of the packet, or to forward the packet to the AP or to a different network segment over the PCI Bus (e.g. for routing.) The AP or PP can create packets of its own for transmission. A 3rd-party NIC (Network Interface Card) on the PCIbus can use the PE memory for receiving packets, and the PP and AP can then cooperate to feed those packets into the classification stream, effectively providing acceleration for packets from arbitrary networks. When doing so, adjacent 2 KB buffers can be concatenated to provide buffers of any size needed for a particular protocol.

Figure 2:
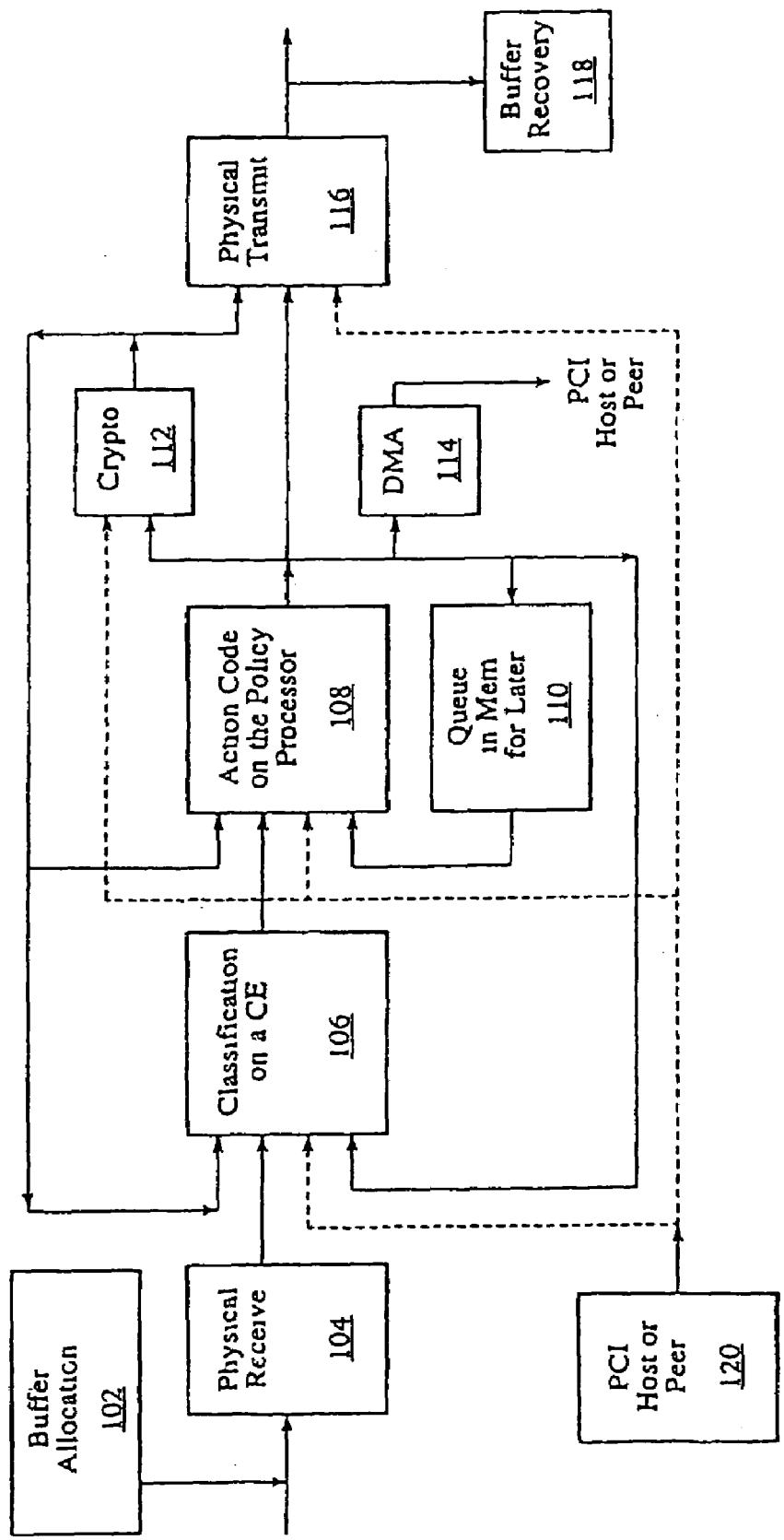
FIG. 2 is a block diagram showing packet flow according to an embodiment of the present invention.

FIG. 2 illustrates packet flow according to certain embodiments of the present invention. Each box represents a process which is applied to a packet buffer and/or the contents of a packet buffer. The buffer management process involves buffer allocation 102 and the recovery of retired buffers 118. When buffer allocation 102 into an RX Ring occurs, the Policy Processor 244 enqueues a buffer pointer into the RX Ring and thus allocates the buffer to the receive MAC 216 or 230, respectively. Upon receiving a packet, the RX MAC controller 220 or 228 uses the buffer pointer at the entry in the RX ring structure which is pointed to by MFILL to identify a 2 KB section of memory 260 that it can use to store the newly received packet. This process of receiving a packet and placing it into a buffer is represented by physical receive 104 in FIG. 2.

The RX MAC controller 220 or 228 increments the MFILL pointer modulo ring size to signal that the buffer whose pointer is in the RX Ring has been filled with a new packet plus receive status. The Ring Translation Unit 264 detects a difference between MFILL and MCCONS and signals to the classification engine 238 or 242, respectively, for RX Ring, that a newly received packet is ready for processing. The Classification Engine 238 or 242 applies Classification 106 to that packet and creates a description of the packet which is placed in the packet buffer software area, then increments MCCONS to indicate that it has completed classification 106 of that packet. The Ring Translation Unit 264 detects a difference between MCCONS and MPCONS and signals to the Policy Processor 244 that a classified packet is ready for action processing 108.

The Policy Processor 244 obtains the buffer pointer from the ring location by dequeueing that pointer from the RX Ring, and executes application-specific action code 108 to determine the disposition of the packet. The action code 108 may choose to send the packet to an Ethernet Transmit MAC 218 or 234 by enqueueing the buffer pointer on a TX Ring, respectively; the packet may or may not have been modified by the action code 108 prior to this. Alternatively the action code 108 may choose to send the packet to the attached cryptographic processor (Crypto) 246 for encryption, decryption, compression, decompression, security key management, parsing of IPSEC headers, or other associated functions; this entire bundle of functions is described by Crypto 112. Alternatively the action code 108 may choose to copy the packet to a PCI peer 322 or 314 or 316, or to the host memory 330, both paths being accomplished by the process 114 of creating a DMA descriptor as shown in Table 3 and then enqueuing the pointer to that descriptor into a DMA Ring by writing that pointer to DMA_PROD, which triggers the DMA Unit 210 to initiate a transfer. Alternatively the action code 118 can choose to temporarily enqueue the packet for delay 110 in memory 260 that is managed by the action code 118. Finally, the action code 108 can choose to send a packet for further classification 106 on any of the Classification Engines 208, 212, 238, or 242, either because the packet has been modified or because there is additional classification which can be run on the packet which the action code 108 can command the Classification process 106 to execute via flags in the RX Status Word, through the buffer's software area, or by use of tag bits in the 32-bit buffer pointer reserved for that use.

Packets can arrive at the classification process 106 from additional sources besides physical receive 104. Classification 106 may receive a packet from the output of the Crypto processing 112, from the Application Processor 302 or from a PCI peer 322 or 314 or 316, or from the application code 108.

Packets can arrive at the action code 108 from classification 106, from the Application Processor 302, from a PCI peer 322 or 314 or 316, from the output of the Crypto processing 112, and from a delay queue 110. Additionally the action code 108 can create a packet. The disposition options for these packets are the same as those described for the receive path, above.

The Crypto processing 112 can receive a packet from the Policy Processor 244 as described above. The Application Processor 302 or a PCI peer 322 or 314 or 316 can also enqueue the pointer to a buffer onto a Crypto Ring to schedule that packet for Crypto processing 112.

The TX MAC 218 or 234 transmits packets whose buffer pointer have been enqueued on the TX Ring, respectively. Those pointers may have been enqueued by the action code 106 running on the Policy Processor 244, by the Crypto processing 112, by the Application Processor 302, or by a PCI peer 322 or 314 or 316. When the TX MAC controller 222 or 232 has retired a buffer either by successfully transmitting the packet it contains, or abandoning the transmit due to transmit termination conditions, it will optionally write back TX status and TX Timestamp if programmed to do so, then will increment MTCONS to indicate that this buffer has been retired. The Ring Translation Unit 264 detects that there is a difference between MTCONS and MTRECOV and signals to the Policy Processor 244 that the TX Ring has at least one retired buffer to recover; this triggers the buffer recovery process 118, which will dequeue the buffer pointer from the TX ring and either send the buffer pointer to Buffer Allocation 102 or will add the recovered buffer to a software-managed free list for later use by Buffer Allocation 102.

It is also possible for a device in the PCI expansion slot 316 to play the role defined for the attached Crypto processor 246 performing crypto processing 112 via DMA 114 in this flow.

Figure 3:
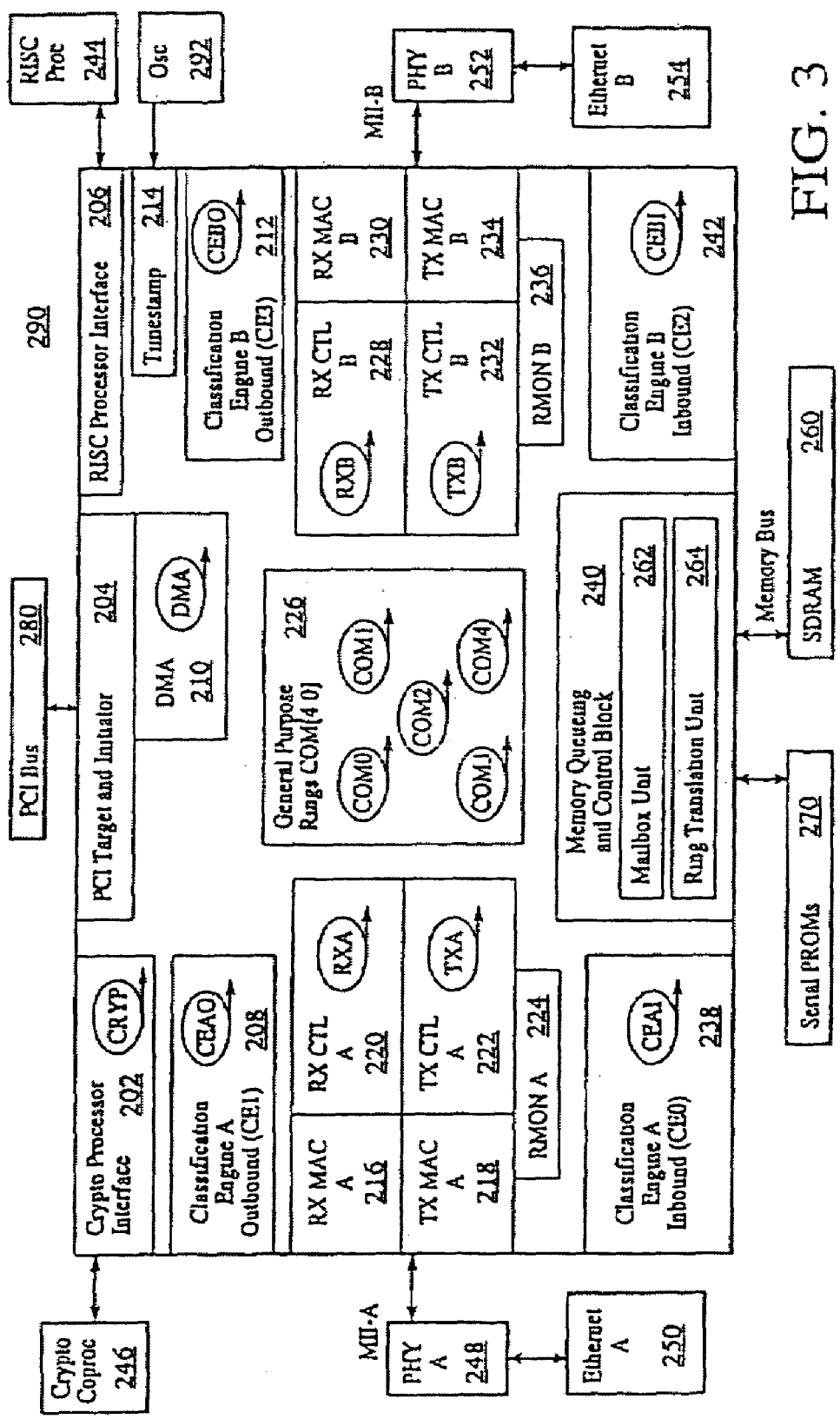
FIG. 3 is a Policy Engine ASIC block diagram according to the present invention.

FIG. 3 shows a Policy Engine ASIC block diagram according to certain embodiments of the present invention.

The ASIC 290 contains an interface 206 to an external RISC microprocessor which is known as the Policy Processor 244. Internal to the RISC Processor Interface 206 are registers for all units in the ASIC 290 to signal status to the RISC Processor 244.

There is an interface 204 to a host PCI Bus 280 which is used for movement of data into and out of the memory 260, and is also used for external access to control registers throughout the ASIC 290. The DMA unit 210 is the Policy Engine 322's agent for master activity on the PCI bus 280. Transactions by DMA 210 are scheduled through the DMA Ring. The Memory Controller 240 receives memory access requests from all agents in the ASIC and translates them to transactions sent to the Synchronous DRAM Memory 260. Addresses issued to the Memory Controller 240 will be translated by the Ring Translation Unit 264 if address bit 27 is a '1', or will be used untranslated by the memory controller 240 to access memory 260 if address bit 27 is a '0'. Untranslated addresses are also examined by the Mailbox Unit 262 and if the address matches the memory address of one of the mailboxes the associated mailbox status bit is set if the transaction is a write, or cleared if the transaction is a read. In addition to the dedicated rings in the Ring Translation Unit 264 which are described here, the Ring Translation Unit also implements 5 general-purpose communications rings COM[4:0] 226 which software can allocate as desired. The memory controller 240 also implements an interface to serial PROMs 270 for obtaining information about memory configuration, MAC addresses, board manufacturing information, Crypto Daughtercard identification and other information.

The ASIC contains two Fast Ethernet MACs MAC_A and MAC_B. Each contains a receive MAC 216 or 230, respectively, with associated control logic and an interface to the memory unit 220 or 228, respectively; and a transmit MAC 218 or 234 respectively with associated control logic and an interface to the memory unit 222 or 232, respectively. Also associated with each MAC is an RMON counter unit 224 or 236, respectively, which counts certain aspects of all packets received and transmitted in support of providing the Ethernet MIB as defined in Internet Engineering Task Force (IETF) standard RFC 1213 and related RFC's.

There are four Classification Engines 208, 212, 238, and 242 which are microprogrammed processors optimized for the predicate analysis associated with packet filtering. Packets are scheduled for processing by these engines through the use of the Reclassify Rings respectively, plus the RX MAC controllers MAC_A 220 and MAC_B 228 can schedule packets for processing by Classification Engines 238 and 242, respectively, through use of the RX Rings, respectively.

There is Crypto Processor Interface 202 which enables attachment of an encryption processor 246. The RISC Processor 244 can issue reads and writes to the Crypto Processor 246 through this interface, and the Crypto Processor 246 can access SDRAM 260 and control and status registers internal to the interface 202 through use of interface 202.

A Timestamp counter 214 is driven by a stable oscillator 292 and is used by the RX MAC logic 220 and 228, the TX MAC logic 222 and 232, the Classification Engines 208, 212, 238, and 242, the Crypto Processor 246, and the Policy Processor 244 to obtain timestamps during processing of packets.

Further details of this system have been described in a patent entitled "Packet Processing System including a Policy Engine having a Classification Unit" filed Jun. 15, 1998, now U.S. Pat. No. 6,157,955. Some details about the NetBoost sample platform have been omitted to confine the disclosure to details related to overall sample software environment.

Those skilled in the art will appreciate variations of the above described embodiments. In addition to these embodiments, other variations will be appreciated by those skilled in the art. As such, the scope of the invention is not limited to the specified embodiments, but is defined by the following claims.

The invention claimed is:

1. A computer program product, disposed on a computer readable storage medium, the product including instructions for causing a processor, at a third network device intermediate to a first network device and a second network device, to:
  access Transmission Control Protocol (TCP) segments of a bidirectional TCP connection between a first TCP end-point operating at the first network device and a second TCP end-point operating at the second network device;
  determine a first TCP state machine state of the first TCP end-point based on at least some of the accessed TCP segments;
  determine a second TCP state machine state of the second TCP end-point based on at least some of the accessed TCP segments;
  reassemble a first TCP data stream of data sent from the first TCP end-point to the second TCP end-point from payloads of the accessed TCP segments sent from the first TCP end-point to the second TCP end-point based on sequence numbers of the accessed TCP segments sent from the first TCP end-point to the second TCP end-point, at least some of the accessed TCP segments sent from the first TCP end-point to the second TCP end-point being received out of order; and
  reassemble a second TCP data stream of data sent from the second TCP end-point to the first TCP end-point from payloads of the accessed TCP segments sent from the second TCP end-point to the first TCP end-point based on sequence numbers of the accessed TCP segments sent from the second TCP end-point to the first TCP end-point, at least some of the accessed TCP segments sent from the second TCP end-point to the first TCP end-point being received out of order.

2. The computer program product of claim 1, wherein the instructions comprise instructions of a software library.

3. The computer program product of claim 2, wherein the instructions comprise instructions of at least one object-oriented class.

4. The computer program of claim 3, wherein the at least one object-oriented class comprises at least one of the following: a class for a bidirectional connection, a class for a TCP end-point, and a class for TCP segment reassembly.

5. The computer program product of claim 1, wherein the instructions that determine the TCP state machine state of the first TCP end-point comprise instructions that determine a change in the TCP state machine state of the first TCP end-point.

6. The computer program product of claim 1, wherein the instructions to reassemble the first TCP data stream of data sent from the first TCP end-point to the second TCP end-point from the payloads of the accessed TCP segments sent from the first TCP end-point to the second TCP end-point comprise instructions that maintain a linked list storing the first TCP data stream in discontiguous memory locations linked by the linked list.

7. The computer program product of claim 1, wherein the instructions further comprise instructions to provide a return code indicating at least one of: whether a TCP segment was received out-of-order and whether a TCP segment overlapped another TCP segment.

8. The computer program product of claim 1, wherein the instructions further comprise instructions to return data of a field within a header of a TCP segment.

9. The computer program product of claim 1, further comprising application program instructions that invoke the instructions to access TCP segments, determine the first TCP state machine state, determine the second TCP state machine state, reassemble the first TCP data stream, and reassemble the second TCP data stream.

10. A method, comprising:
  providing a software library embodied on a computer readable storage medium featuring operations to cause a processor at a third network device intermediate to a first network device and a second network device to:
  access Transmission Control Protocol (TCP) segments of a bidirectional TCP connection between a first TCP end-point operating at the first network device and a second TCP end-point operating at the second network device;
  determine a first TCP state machine state of the first TCP end-point based on at least some of the accessed TCP segments;
  determine a second TCP state machine state of the second TCP end-point based on at least some of the accessed TCP segments;
  reassemble a first TCP data stream of data sent from the first TCP end-point to the second TCP end-point from payloads of the accessed TCP segments sent from the first TCP end-point to the second TCP end-point based on sequence numbers of the accessed TCP segments sent from the first TCP end-point to the second TCP end-point, at least some of the accessed TCP segments sent from the first TCP end-point to the second TCP end-point being received out of order; and
  reassemble a second TCP data stream of data sent from the second TCP end-point to the first TCP end-point from payloads of the accessed TCP segments sent from the second TCP end-point to the first TCP end-point based on sequence numbers of the accessed TCP segments sent from the second TCP end-point to the first TCP end-point, at least some of the accessed TCP segments sent from the second TCP end-point to the first TCP end-point being received out of order.

11. The method of claim 10, wherein the operations to determine the TCP state machine state of the first end-point comprises operations to determine a change in the TCP state machine state of the first end-point.

12. The method of claim 10, wherein the software library comprises at least one object-oriented class.

13. The method of claim 10, wherein the at least one object-oriented class comprises at least one of the following:

a class for a bidirectional connection, a class for a TCP end-point, and a class for TCP segment reassembly.

14. The method of claim 10, wherein the operations to reassemble data from accessed TCP segments sent from the first TCP end-point to the second TCP end-point comprise operations that maintain a linked list storing the first TCP data stream in discontiguous memory locations linked by the linked list.

15. The method of claim 10, wherein the operations further comprise operations to provide a return code indicating at least one of: whether a TCP segment was received out-of-order and whether a TCP segment overlapped another TCP segment.

16. The method of claim 10, wherein the operations further comprise operations to return data of a field within a header of a TCP segment.

17. The method of claim 10, further comprising invoking the software library operations from an application program.

* * * * *